United States Patent
Richardson et al.

(10) Patent No.: US 7,978,618 B2
(45) Date of Patent: Jul. 12, 2011

(54) METHODS AND SYSTEMS FOR USER INTERFACE CUSTOMIZATION

(75) Inventors: Tanna Marie Richardson, Happy Valley, OR (US); Ginger Marie Finnegan, Manhattan Beach, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 520 days.

(21) Appl. No.: 11/562,342

(22) Filed: Nov. 21, 2006

(65) Prior Publication Data

US 2007/0091010 A1    Apr. 26, 2007

Related U.S. Application Data

(63) Continuation-in-part of application No. 10/962,248, filed on Oct. 8, 2004, and a continuation-in-part of application No. 10/961,793, filed on Oct. 8, 2004, and a continuation-in-part of application No. 10/961,911, filed on Oct. 8, 2004, and a continuation-in-part of application No. 10/961,594, filed on Oct. 8, 2004, and a continuation-in-part of application No. 10/962,103, filed on Oct. 8, 2004.

(51) Int. Cl.
    *G09G 5/00* (2006.01)
(52) U.S. Cl. ......... 370/252; 345/2.1; 345/594; 715/744; 715/745; 715/839; 715/854
(58) Field of Classification Search ............... 358/1.15; 399/80–81, 8; 705/28; 713/176; 715/840; 709/220

See application file for complete search history.

(56) References Cited

U.S. PATENT DOCUMENTS

| | | | |
|---|---|---|---|
| 5,085,587 A | 2/1992 | DesForges et al. |
| 5,323,393 A | 6/1994 | Barrett et al. |
| 5,365,494 A | 11/1994 | Lynch |
| 5,504,589 A | 4/1996 | Montague et al. |
| 5,513,112 A | 4/1996 | Herring et al. |
| 5,659,845 A | 8/1997 | Krist et al. |
| 5,671,412 A | 9/1997 | Christiano |
| 5,699,493 A | 12/1997 | Davidson et al. |
| 5,699,494 A | 12/1997 | Colbert et al. |
| 5,717,439 A | 2/1998 | Levine et al. |
| 5,726,883 A | 3/1998 | Levine et al. |
| 5,727,082 A | 3/1998 | Sugishima |
| 5,727,135 A | 3/1998 | Webb et al. |
| 5,745,883 A | 4/1998 | Krist et al. |
| 5,760,775 A | 6/1998 | Sklut et al. |

(Continued)

FOREIGN PATENT DOCUMENTS

EP          1160657          12/2001

(Continued)

OTHER PUBLICATIONS

F.D. Wright, Design Goals for an Internet Printing Protocol, Apr. 1999, pp. 1-43, http://tools.ietf.org/html/rfc2567.

(Continued)

*Primary Examiner* — Robert W Wilson
*Assistant Examiner* — Mohamed Kamara
(74) *Attorney, Agent, or Firm* — Kristine E. Matthews; David C. Ripma

(57) ABSTRACT

Embodiments of the present invention comprise systems and methods for user interface customization.

20 Claims, 13 Drawing Sheets

U.S. PATENT DOCUMENTS

| | | |
|---|---|---|
| 5,774,678 A | 6/1998 | Motoyama |
| 5,791,790 A | 8/1998 | Bender et al. |
| 5,796,934 A | 8/1998 | Bhanot et al. |
| 5,799,206 A | 8/1998 | Kitagawa et al. |
| 5,799,289 A | 8/1998 | Fukushima et al. |
| 5,812,818 A | 9/1998 | Adler et al. |
| 5,832,264 A | 11/1998 | Hart et al. |
| 5,877,776 A | 3/1999 | Beaman et al. |
| 5,944,824 A | 8/1999 | He |
| 5,956,487 A | 9/1999 | Venkatraman et al. |
| 5,956,698 A | 9/1999 | Lacheze et al. |
| 5,968,127 A | 10/1999 | Kawabe et al. |
| 5,993,088 A | 11/1999 | Nogay et al. |
| 5,995,553 A | 11/1999 | Crandall et al. |
| 5,999,708 A | 12/1999 | Kajita |
| 6,042,384 A | 3/2000 | Loiacono |
| 6,069,706 A | 5/2000 | Kajita |
| 6,075,860 A | 6/2000 | Ketcham |
| 6,115,132 A | 9/2000 | Nakasuma et al. |
| 6,118,546 A | 9/2000 | Sanchez et al. |
| 6,128,731 A | 10/2000 | Zarrin et al. |
| 6,141,662 A | 10/2000 | Jeyachandran |
| 6,148,346 A | 11/2000 | Hanson |
| 6,161,139 A | 12/2000 | Win et al. |
| 6,178,308 B1 | 1/2001 | Bobrow et al. |
| 6,199,080 B1 | 3/2001 | Nielsen |
| 6,213,652 B1 | 4/2001 | Suzuki et al. |
| 6,216,113 B1 | 4/2001 | Aikens et al. |
| 6,233,409 B1 | 5/2001 | Haines et al. |
| 6,240,456 B1 | 5/2001 | Teng et al. |
| 6,246,487 B1 | 6/2001 | Kobayashi |
| 6,263,346 B1 * | 7/2001 | Rodriquez .................. 709/203 |
| 6,292,267 B1 | 9/2001 | Mori et al. |
| 6,301,016 B1 | 10/2001 | Matsueda et al. |
| 6,307,640 B1 | 10/2001 | Motegi |
| 6,311,040 B1 | 10/2001 | Kucinski et al. |
| 6,353,878 B1 | 3/2002 | Dunham |
| 6,369,905 B1 | 4/2002 | Mitsuhashi et al. |
| 6,426,798 B1 | 7/2002 | Yeung |
| 6,433,883 B1 | 8/2002 | Kajita |
| 6,438,589 B1 | 8/2002 | Iwata |
| 6,476,926 B1 | 11/2002 | Yano et al. |
| 6,490,601 B1 | 12/2002 | Markus et al. |
| 6,510,466 B1 | 1/2003 | Cox et al. |
| 6,516,157 B1 | 2/2003 | Maruta et al. |
| 6,526,258 B2 | 2/2003 | Bejar et al. |
| 6,567,179 B1 | 5/2003 | Sato et al. |
| 6,590,673 B2 | 7/2003 | Kadowaki |
| 6,597,469 B1 | 7/2003 | Kuroyanagi |
| 6,604,157 B1 | 8/2003 | Brusky et al. |
| 6,621,422 B2 | 9/2003 | Rubenstein |
| 6,636,929 B1 | 10/2003 | Frantz et al. |
| 6,643,650 B1 | 11/2003 | Slaughter et al. |
| 6,652,169 B2 | 11/2003 | Parry |
| 6,685,637 B1 | 2/2004 | Rom |
| 6,721,286 B1 | 4/2004 | Williams et al. |
| 6,735,773 B1 | 5/2004 | Trinh et al. |
| 6,749,434 B2 | 6/2004 | Stuppy |
| 6,772,945 B2 | 8/2004 | Mahoney et al. |
| 6,775,729 B1 | 8/2004 | Matsuo et al. |
| 6,826,727 B1 | 11/2004 | Mohr et al. |
| 6,836,845 B1 | 12/2004 | Lennie et al. |
| 6,850,252 B1 | 2/2005 | Hoffberg |
| 6,862,110 B2 | 3/2005 | Harrington |
| 6,873,429 B2 | 3/2005 | Matsuura |
| 6,874,010 B1 | 3/2005 | Sargent |
| 6,904,412 B1 | 6/2005 | Broadbent et al. |
| 6,915,525 B2 | 7/2005 | Ozawa |
| 6,934,706 B1 | 8/2005 | Mancuso et al. |
| 6,934,740 B1 | 8/2005 | Lawande et al. |
| 6,940,532 B1 | 9/2005 | Fukui et al. |
| 6,948,175 B1 | 9/2005 | Fong et al. |
| 6,951,303 B2 | 10/2005 | Peterson et al. |
| 6,975,820 B2 | 12/2005 | Wong |
| 6,999,987 B1 | 2/2006 | Billingsley et al. |
| 7,013,289 B2 | 3/2006 | Horn et al. |
| 7,019,753 B2 | 3/2006 | Rappaport et al. |
| 7,079,143 B2 | 7/2006 | Gilbert |
| 7,095,513 B2 | 8/2006 | Stringham |
| 7,107,615 B2 | 9/2006 | Cossel et al. |
| 7,124,097 B2 | 10/2006 | Claremont et al. |
| 7,127,700 B2 | 10/2006 | Large |
| 7,136,909 B2 * | 11/2006 | Balasuriya .................. 709/220 |
| 7,136,941 B2 | 11/2006 | Nguyen et al. |
| 7,143,364 B1 * | 11/2006 | Tam .............................. 715/840 |
| 7,145,673 B1 | 12/2006 | Lin |
| 7,149,697 B2 | 12/2006 | Zerza et al. |
| 7,162,103 B2 | 1/2007 | Meunier et al. |
| 7,170,618 B2 | 1/2007 | Fujitani et al. |
| 7,174,056 B2 | 2/2007 | Silverbrook et al. |
| 7,177,814 B2 | 2/2007 | Gong et al. |
| 7,181,017 B1 | 2/2007 | Nagel et al. |
| 7,181,442 B2 | 2/2007 | Yeh et al. |
| 7,185,078 B2 | 2/2007 | Pleyer et al. |
| 7,188,125 B1 | 3/2007 | Karr |
| 7,188,181 B1 | 3/2007 | Squier et al. |
| 7,197,615 B2 | 3/2007 | Arakawa et al. |
| 7,203,699 B2 | 4/2007 | Bellamy |
| 7,212,301 B2 | 5/2007 | Treibach-Heck et al. |
| 7,216,347 B1 | 5/2007 | Harrison et al. |
| 7,233,929 B1 | 6/2007 | Lingle et al. |
| 7,239,409 B2 | 7/2007 | Parry |
| RE39,808 E | 9/2007 | Motegi |
| 7,272,269 B2 | 9/2007 | Tojo et al. |
| 7,275,044 B2 | 9/2007 | Chauvin et al. |
| 7,284,061 B2 | 10/2007 | Matsubayashi et al. |
| 7,293,034 B2 | 11/2007 | Paya et al. |
| 7,296,221 B1 | 11/2007 | Treibach-Heck et al. |
| 7,301,658 B2 | 11/2007 | Henry |
| 7,305,616 B1 | 12/2007 | Nelson et al. |
| 7,321,440 B2 | 1/2008 | Kimura |
| 7,325,196 B1 | 1/2008 | Covington et al. |
| 7,327,478 B2 | 2/2008 | Matsuda |
| 7,328,245 B1 | 2/2008 | Hull et al. |
| 7,349,949 B1 | 3/2008 | Connor et al. |
| 7,363,586 B1 | 4/2008 | Briggs et al. |
| 7,404,204 B2 | 7/2008 | Davenport et al. |
| 7,406,660 B1 | 7/2008 | Sikchi et al. |
| 7,444,519 B2 | 10/2008 | Laferriere et al. |
| 7,451,392 B1 | 11/2008 | Chalecki et al. |
| 7,454,623 B2 | 11/2008 | Hardt |
| 7,496,837 B1 | 2/2009 | Larcheveque et al. |
| 7,500,178 B1 | 3/2009 | O'Donnell |
| 7,508,535 B2 | 3/2009 | Hart et al. |
| 7,509,649 B2 | 3/2009 | Shenfield |
| 7,545,528 B2 | 6/2009 | Takabayashi et al. |
| 7,548,334 B2 | 6/2009 | Lo et al. |
| 7,552,265 B2 | 6/2009 | Newman et al. |
| 7,565,554 B2 | 7/2009 | Joosten et al. |
| 7,567,360 B2 | 7/2009 | Takahashi et al. |
| 7,573,593 B2 | 8/2009 | Hart et al. |
| 7,729,363 B2 | 6/2010 | Shenfield et al. |
| 2001/0021945 A1 | 9/2001 | Matsuura |
| 2001/0027527 A1 | 10/2001 | Khidekel et al. |
| 2001/0028808 A1 | 10/2001 | Nomura et al. |
| 2001/0038462 A1 | 11/2001 | Teeuwen et al. |
| 2001/0039614 A1 | 11/2001 | Hellberg et al. |
| 2001/0044787 A1 | 11/2001 | Shwartz et al. |
| 2002/0016921 A1 | 2/2002 | Olsen et al. |
| 2002/0029256 A1 | 3/2002 | Zintel et al. |
| 2002/0032745 A1 | 3/2002 | Honda |
| 2002/0049786 A1 | 4/2002 | Bibliowicz et al. |
| 2002/0052916 A1 | 5/2002 | Kloba et al. |
| 2002/0055984 A1 | 5/2002 | Chang et al. |
| 2002/0059265 A1 | 5/2002 | Valorose, III |
| 2002/0073148 A1 | 6/2002 | Haines et al. |
| 2002/0080381 A1 | 6/2002 | Haines |
| 2002/0089691 A1 | 7/2002 | Fertlitsch et al. |
| 2002/0093676 A1 | 7/2002 | Parry |
| 2002/0097277 A1 * | 7/2002 | Pitroda ........................ 345/854 |
| 2002/0098027 A1 | 7/2002 | Koike et al. |
| 2002/0099796 A1 | 7/2002 | Chou |
| 2002/0103827 A1 | 8/2002 | Sesek |
| 2002/0105664 A1 | 8/2002 | Inoue et al. |
| 2002/0107939 A1 | 8/2002 | Ford et al. |
| 2002/0109718 A1 | 8/2002 | Mansour et al. |
| 2002/0112037 A1 | 8/2002 | Koss |

| | | | | | | |
|---|---|---|---|---|---|---|
| 2002/0120792 A1 | 8/2002 | Blair et al. | 2004/0169881 A1 | 9/2004 | Sato | |
| 2002/0138279 A1 | 9/2002 | Al-Kazily et al. | 2004/0179229 A1 | 9/2004 | Laughlin | |
| 2002/0138476 A1 | 9/2002 | Suwa et al. | 2004/0203358 A1 | 10/2004 | Anderson et al. | |
| 2002/0138666 A1 | 9/2002 | Fujisawa | 2004/0205118 A1 | 10/2004 | Yu | |
| 2002/0145627 A1 | 10/2002 | Whitmarsh et al. | 2004/0205533 A1 | 10/2004 | Lopata et al. | |
| 2002/0147858 A1 | 10/2002 | Motoyama et al. | 2004/0205620 A1 | 10/2004 | Nishikiori et al. | |
| 2002/0152183 A1 | 10/2002 | Soares et al. | 2004/0212823 A1* | 10/2004 | Chavers et al. | 358/1.15 |
| 2002/0152235 A1 | 10/2002 | Motoyama et al. | 2004/0215671 A1 | 10/2004 | Hyakutake et al. | |
| 2002/0152302 A1 | 10/2002 | Motoyama et al. | 2004/0221231 A1 | 11/2004 | Madril et al. | |
| 2002/0171857 A1 | 11/2002 | Hisatomi et al. | 2004/0223778 A1 | 11/2004 | Zwiefelhofer | |
| 2002/0194350 A1 | 12/2002 | Lu et al. | 2004/0226993 A1 | 11/2004 | Fulcher et al. | |
| 2003/0002074 A1 | 1/2003 | Miyano | 2004/0227968 A1 | 11/2004 | Nakamura et al. | |
| 2003/0007170 A1 | 1/2003 | Kajita et al. | 2004/0230500 A1 | 11/2004 | Imago | |
| 2003/0011633 A1 | 1/2003 | Conley | 2004/0236862 A1 | 11/2004 | Ito | |
| 2003/0011640 A1 | 1/2003 | Green | 2004/0254955 A1 | 12/2004 | Reese et al. | |
| 2003/0014515 A1 | 1/2003 | Motoyama et al. | 2004/0255263 A1 | 12/2004 | Ando | |
| 2003/0014529 A1 | 1/2003 | Simpson et al. | 2004/0268229 A1 | 12/2004 | Paoli et al. | |
| 2003/0033369 A1 | 2/2003 | Bernhard | 2004/0268306 A1 | 12/2004 | Cheng et al. | |
| 2003/0035133 A1 | 2/2003 | Berkema et al. | 2005/0005094 A1 | 1/2005 | Jamieson et al. | |
| 2003/0038965 A1 | 2/2003 | Simpson et al. | 2005/0015472 A1 | 1/2005 | Catania et al. | |
| 2003/0043205 A1 | 3/2003 | Hill | 2005/0026593 A1 | 2/2005 | Anderson et al. | |
| 2003/0043396 A1 | 3/2003 | Klosterman et al. | 2005/0028086 A1 | 2/2005 | Itavaara et al. | |
| 2003/0048470 A1 | 3/2003 | Garcia | 2005/0044248 A1 | 2/2005 | Mihira et al. | |
| 2003/0048473 A1 | 3/2003 | Rosen | 2005/0055475 A1 | 3/2005 | MacKay et al. | |
| 2003/0049037 A1 | 3/2003 | Sadowara et al. | 2005/0057560 A1 | 3/2005 | Bibr et al. | |
| 2003/0053123 A1 | 3/2003 | Wu et al. | 2005/0060046 A1 | 3/2005 | Ito et al. | |
| 2003/0063313 A1 | 4/2003 | Ito | 2005/0060564 A1 | 3/2005 | Murakami et al. | |
| 2003/0065766 A1 | 4/2003 | Parry | 2005/0063010 A1 | 3/2005 | Giannetti | |
| 2003/0065791 A1 | 4/2003 | Garg et al. | 2005/0068581 A1 | 3/2005 | Hull et al. | |
| 2003/0081240 A1 | 5/2003 | Soto et al. | 2005/0071507 A1 | 3/2005 | Ferlitsch | |
| 2003/0084114 A1 | 5/2003 | Simpson et al. | 2005/0071746 A1 | 3/2005 | Hart et al. | |
| 2003/0088642 A1 | 5/2003 | Price et al. | 2005/0080649 A1 | 4/2005 | Alvarez et al. | |
| 2003/0123112 A1 | 7/2003 | Kajita et al. | 2005/0091087 A1 | 4/2005 | Smith et al. | |
| 2003/0142351 A1 | 7/2003 | Sakura | 2005/0091490 A1 | 4/2005 | Ogura | |
| 2003/0164987 A1 | 9/2003 | Enomoto et al. | 2005/0097458 A1 | 5/2005 | Wilson | |
| 2003/0182632 A1 | 9/2003 | Murdock et al. | 2005/0108353 A1 | 5/2005 | Yamamoto | |
| 2003/0184552 A1 | 10/2003 | Chadha | 2005/0114267 A1 | 5/2005 | Miwa et al. | |
| 2003/0184590 A1 | 10/2003 | Will | 2005/0114658 A1 | 5/2005 | Dye et al. | |
| 2003/0184782 A1 | 10/2003 | Perkins et al. | 2005/0114766 A1 | 5/2005 | Yamamoto | |
| 2003/0187922 A1 | 10/2003 | Ohara et al. | 2005/0129423 A1 | 6/2005 | Lester et al. | |
| 2003/0188193 A1 | 10/2003 | Venkataramappa | 2005/0149576 A1 | 7/2005 | Marmaros et al. | |
| 2003/0197883 A1 | 10/2003 | Lay et al. | 2005/0152334 A1 | 7/2005 | Okamoto et al. | |
| 2003/0223766 A1 | 12/2003 | Imai | 2005/0185217 A1 | 8/2005 | Nishizawa et al. | |
| 2003/0225796 A1 | 12/2003 | Matsubara | 2005/0195221 A1 | 9/2005 | Berger et al. | |
| 2003/0225829 A1 | 12/2003 | Pena et al. | 2005/0223413 A1 | 10/2005 | Duggan et al. | |
| 2003/0225894 A1 | 12/2003 | Ito | 2005/0231755 A1 | 10/2005 | Araumi et al. | |
| 2003/0231196 A1 | 12/2003 | Keohane et al. | 2005/0246428 A1 | 11/2005 | Araumi | |
| 2004/0003341 A1 | 1/2004 | alSafadi et al. | 2005/0257134 A1 | 11/2005 | Goodman et al. | |
| 2004/0008363 A1 | 1/2004 | Suzuki et al. | 2005/0257148 A1 | 11/2005 | Goodman et al. | |
| 2004/0012628 A1 | 1/2004 | Kropf et al. | 2005/0265744 A1* | 12/2005 | Uruta | 399/80 |
| 2004/0012644 A1 | 1/2004 | Allen et al. | 2006/0007480 A1 | 1/2006 | Yokokura | |
| 2004/0039990 A1 | 2/2004 | Bakar et al. | 2006/0010180 A1 | 1/2006 | Kawamura et al. | |
| 2004/0044779 A1 | 3/2004 | Lambert | 2006/0015734 A1* | 1/2006 | Atobe | 713/176 |
| 2004/0054573 A1 | 3/2004 | Shah et al. | 2006/0031411 A1 | 2/2006 | Gimson et al. | |
| 2004/0061729 A1 | 4/2004 | Green et al. | 2006/0038004 A1 | 2/2006 | Rielly et al. | |
| 2004/0064759 A1 | 4/2004 | McGuire et al. | 2006/0056873 A1* | 3/2006 | Kimura | 399/81 |
| 2004/0070606 A1 | 4/2004 | Yang et al. | 2006/0059434 A1 | 3/2006 | Boss et al. | |
| 2004/0080511 A1 | 4/2004 | Gilbert | 2006/0064647 A1 | 3/2006 | Tapuska et al. | |
| 2004/0080771 A1 | 4/2004 | Mihira et al. | 2006/0077423 A1 | 4/2006 | Mathieson et al. | |
| 2004/0080778 A1 | 4/2004 | Ito et al. | 2006/0077432 A1 | 4/2006 | Lovat et al. | |
| 2004/0098165 A1 | 5/2004 | Butikofer | 2006/0077439 A1 | 4/2006 | Yamamura et al. | |
| 2004/0098316 A1 | 5/2004 | Philippe et al. | 2006/0077444 A1 | 4/2006 | Lum et al. | |
| 2004/0098595 A1 | 5/2004 | Apperle et al. | 2006/0085835 A1 | 4/2006 | Istvan et al. | |
| 2004/0105104 A1 | 6/2004 | Ishikawa et al. | 2006/0112123 A1 | 5/2006 | Clark et al. | |
| 2004/0105122 A1 | 6/2004 | Schaeffer | 2006/0154227 A1 | 7/2006 | Rossi et al. | |
| 2004/0109028 A1 | 6/2004 | Stern et al. | 2006/0162076 A1 | 7/2006 | Bartlett et al. | |
| 2004/0111670 A1 | 6/2004 | Sasakuma et al. | 2006/0198653 A1 | 9/2006 | Plewnia et al. | |
| 2004/0113941 A1 | 6/2004 | Sliwa et al. | 2006/0224405 A1 | 10/2006 | White et al. | |
| 2004/0117358 A1 | 6/2004 | von Kaenel et al. | 2006/0279475 A1 | 12/2006 | Lum et al. | |
| 2004/0117784 A1 | 6/2004 | Endoh | 2007/0022180 A1 | 1/2007 | Cocotis et al. | |
| 2004/0125403 A1 | 7/2004 | Furst et al. | 2007/0041035 A1 | 2/2007 | Sembower et al. | |
| 2004/0130744 A1 | 7/2004 | Wu et al. | 2007/0094103 A1* | 4/2007 | Hyakutake et al. | 705/28 |
| 2004/0130749 A1 | 7/2004 | Aoki | 2007/0173266 A1 | 7/2007 | Barnes, Jr. | |
| 2004/0133525 A1 | 7/2004 | Singh et al. | 2007/0174894 A1 | 7/2007 | Matsunaga | |
| 2004/0150663 A1 | 8/2004 | Kim | 2008/0072162 A1 | 3/2008 | Dauerer et al. | |
| 2004/0158471 A1 | 8/2004 | Davis et al. | | | | |
| 2004/0161257 A1 | 8/2004 | Ishihara | | | | |
| 2004/0162076 A1 | 8/2004 | Chowdry et al. | JP | 08234945 | 9/1996 | |
| 2004/0165209 A1 | 8/2004 | Aoki et al. | JP | 09293036 | 11/1997 | |

FOREIGN PATENT DOCUMENTS

| | | |
|---|---|---|
| JP | 09330190 | 12/1997 |
| JP | 10013695 | 1/1998 |
| JP | 10154190 A | 6/1998 |
| JP | 10240490 | 9/1998 |
| JP | 2000112691 | 4/2000 |
| JP | 2000174949 | 6/2000 |
| JP | 2000207108 | 7/2000 |
| JP | 2002259071 | 2/2001 |
| JP | 200284383 | 3/2002 |
| JP | 2002175195 | 6/2002 |
| JP | 2002236830 | 8/2002 |
| JP | 2002298049 A | 10/2002 |
| JP | 2002312148 | 10/2002 |
| JP | 2002330253 | 11/2002 |
| JP | 2002351644 | 12/2002 |
| JP | 2003022258 | 1/2003 |
| JP | 2003050781 | 2/2003 |
| JP | 2003157155 A | 5/2003 |
| JP | 2003178023 | 6/2003 |
| JP | 2003196554 A | 7/2003 |
| JP | 2003198792 | 7/2003 |
| JP | 2003208484 | 7/2003 |
| JP | 2003209644 | 7/2003 |
| JP | 2003216368 | 7/2003 |
| JP | 2003216395 A | 7/2003 |
| JP | 2003223299 | 8/2003 |
| JP | 2003260853 | 9/2003 |
| JP | 2003281227 | 10/2003 |
| JP | 2003288179 | 10/2003 |
| JP | 2003308195 | 10/2003 |
| JP | 200430448 | 1/2004 |
| JP | 2004088561 | 3/2004 |
| JP | 2004094313 | 3/2004 |
| JP | 2004128561 | 4/2004 |
| JP | 2004118549 | 5/2004 |
| JP | 2004164157 A | 6/2004 |
| JP | 2004213356 | 7/2004 |
| JP | 2004215309 | 7/2004 |
| JP | 2004222247 | 8/2004 |
| JP | 2004228686 | 8/2004 |
| JP | 2004228687 | 8/2004 |
| JP | 2004240752 | 8/2004 |
| JP | 2004246771 | 9/2004 |
| JP | 2004310326 | 11/2004 |
| JP | 2004310516 | 11/2004 |
| JP | 2004276271 | 12/2004 |
| JP | 2004358800 | 12/2004 |
| JP | 2005014591 | 1/2005 |
| JP | 2005033460 | 2/2005 |
| JP | 2005059496 | 3/2005 |
| JP | 2005078278 | 3/2005 |
| JP | 2005084891 | 3/2005 |
| JP | 2005004243 | 6/2005 |
| JP | 2005209059 | 8/2005 |
| JP | 2005219440 A | 8/2005 |
| JP | 2005235034 A | 9/2005 |
| JP | 2005269250 | 9/2005 |
| JP | 2006053905 | 2/2006 |
| JP | 2006140898 | 6/2006 |
| WO | WO0118754 A1 | 3/2001 |
| WO | WO01/33381 | 5/2001 |
| WO | WO0198864 | 12/2001 |

OTHER PUBLICATIONS

R. Herriot, Internet Printing Protocol (IPP): Event Notifications and Subscriptions (Feb. 21, 2003, retrieved from http://tools.ietf.org/html/draft-ietf-ipp-not-spec-11 on Aug. 20, 2008, pp. 1-101).
T. Hastings, "Internet Printing Protocol/1.1: Model and Semantics" (Sep. 2000, retrieved from http://www.ietf.org/rfc/rfc291.txt on Sep. 18, 2008, pp. 1-210).
R. Herriot, Internet Printing Protocol (IPP): Event Notifications and Subscriptions, Jun. 21, 2004, http://tools.ietf.org/html/draft-ietf-ipp-not-spec-12, pp. 1-98.
Microsoft Corporation. Microsoft Computer Dictionary, Fifth Edition, 2002 Microsoft Press, pp. 487-488.
Gaedke, Martin et al. "A Modeling Approach to Federated Identity and Access Management", May 2005 ACM.
FOLDOC. "relational database", Jun. 2002, retrieved from <http://foldoc.org/index.cgi?query=relational+database>.
OASIS. "Security Assertion Markup Language (SAML) 2.0 Technical Overview", Working Draft 01, Jul. 22, 2004, <http://www.oasis-open.org/committees/documents.php?wg_abbrev=security>.
Hartman, Bret et al. Mastering Web Services Security, 2003 Wiley Publishing, Inc., pp. 36-46.
U.S. Appl. No. 10/962,248—Office Action dated Aug. 19, 2008.
U.S. Appl. No. 10/961,793—Office Action dated Jun. 20, 2008.
U.S. Appl. No. 10/961,793—Office Action dated Dec. 19, 2008.
U.S. Appl. No. 10/961,911—Office Action dated Oct. 28, 2008.
U.S. Appl. No. 10/961,594—Office Action dated Dec. 3, 2008.
U.S. Appl. No. 10/961,594—Office Action dated Mar. 16, 2009.
U.S. Appl. No. 10/962,103—Office Action dated Jul. 9, 2008.
U.S. Appl. No. 10/962,103—Office Action dated Jan. 23, 2009.
U.S. Appl. No. 11/232,827—Office Action dated Dec. 5, 2008.
U.S. Appl. No. 11/073,055—Office Action dated Sep. 18, 2008.
U.S. Appl. No. 11/073,055—Office Action dated Mar. 4, 2009.
U.S. Appl. No. 11/233,202—Office Action dated Jun. 5, 2008.
U.S. Appl. No. 11/233,202—Office Action dated Dec. 1, 2008.
U.S. Appl. No. 11/233,201—Office Action dated Oct. 3, 2008.
U.S. Appl. No. 11/232,552—Office Action dated Nov. 18, 2008.
U.S. Appl. No. 11/233,270—Office Action dated Sep. 17, 2008.
U.S. Appl. No. 11/241,501—Office Action dated Oct. 23, 2008.
U.S. Appl. No. 11/241,497—Office Action dated Feb. 20, 2009.
U.S. Appl. No. 11/241,497—Office Action dated Aug. 27, 2008.
U.S. Appl. No. 11/241,011—Office Action dated Oct. 8, 2008.
U.S. Appl. No. 11/241,010—Office Action dated Oct. 9, 2008.
U.S. Appl. No. 11/241,071—Office Action dated Mar. 3, 2009.
U.S. Appl. No. 11/241,071—Office Action dated Sep. 19, 2008.
U.S. Appl. No. 11/241,447—Office Action dated Mar. 5, 2009.
U.S. Appl. No. 11/241,447—Office Action dated Sep. 15, 2008.
U.S. Appl. No. 11/241,498—Office Action dated Sep. 16, 2008.
U.S. Appl. No. 11/241,498—Office Action dated Mar. 5, 2009.
U.S. Appl. No. 11/240,039—Office Action dated Oct. 20, 2008.
U.S. Appl. No. 11/240,156—Office Action dated Aug. 28, 2008.
U.S. Appl. No. 11/240,156—Office Action dated Feb. 20, 2009.
U.S. Appl. No. 11/255,611—Office Action dated Mar. 12, 2009.
U.S. Appl. No. 11/256,479—Office Action dated Nov. 4, 2008.
U.S. Appl. No. 11/255,333—Office Action dated Mar. 13, 2009.
U.S. Appl. No. 11/193,154—Office Action dated Dec. 2, 2008.
U.S. Appl. No. 11/192,630—Office Action dated Jan. 21, 2009.
U.S. Appl. No. 11/192,546—Office Action dated Jan. 22, 2009.
U.S. Appl. No. 11/192,836—Office Action dated Jul. 9, 2008.
U.S. Appl. No. 11/193,147—Office Action dated Jul. 9, 2008.
U.S. Appl. No. 11/192,868—Office Action dated Feb. 2, 2009.
U.S. Appl. No. 11/192,629—Office Action dated Jan. 22, 2009.
U.S. Appl. No. 11/193,151—Office Action dated Feb. 23, 2009.
U.S. Appl. No. 11/193,188—Office Action dated Jan. 21, 2009.
U.S. Appl. No. 11/193,140—Office Action dated Nov. 18, 2008.
U.S. Appl. No. 11/192,796—Office Action dated Feb. 24, 2009.
U.S. Appl. No. 11/192,547—Office Action dated Feb. 5, 2009.
U.S. Appl. No. 11/240,084—Office Action dated Oct. 30, 2008.
U.S. Appl. No. 11/218,033—Office Action dated Sep. 12, 2008.
U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.
U.S. Appl. No. 11/193,147—Office Action dated Dec. 6, 2007.
U.S. Appl. No. 11/193,147—Office Action dated Jul. 23, 2007.
U.S. Appl. No. 11/193,147—Office Action dated Feb. 9, 2007.
Canon USA, Inc.; MEAP Multifunctional Embedded Application Platform; Aug. 2004; http://developersupport.canon.com/MEAP.htm.
Canon USA, Inc.; MEAP; FAQ; accessed on Jul. 2004, pub. date unknown; http://developersupport.canon.com/MEAP.htm.
Xerox, Inc., Xerox FreeFlow digital workflow collection; 2003; http://www.xerox.com/downloads/usa/en/s/solutions_digital_workflow_whitepaper_sdk.pdf.

Ricoh Company, Ltd.; Ricoh's Medium-Term Management Plan; Mar. 19, 2002; http://www.ricoh.com/IR/data/pre/pdf/ir_pre2002.pdf.

Ricoh Company, Ltd.; White Paper; Embedded Software Architecture SDK; Jun. 25, 2003; http://www.ricoh-usa.com/products/concept/esa.asp?catname=ESA.

Hewlett-Packard Company; JetCAPS Scan2Folder; 2003; http://www.jetcaps.se/resources/datasheets/ds_scan2folder.pdf.

Hewlett-Packard Company; JetCAPS chai applications; Dec. 9, 2002; http://www.stethos.com/chai/data/d_us_chai.pdf.

Ratha, N.K., Connell, J.H., Bolle, R.M. "Enhancing security and privacy in biometrics-based authentication systems". IBM Systems Journal 40(3), pp. 614-634 (2001).

U.S. Appl. No. 10/962,248—Final Office Action dated Jun. 10, 2009.
U.S. Appl. No. 10/962,248—Non-Final Office Action dated Jan. 29, 2010.
U.S. Appl. No. 11/232,588—Non-Final Office Action dated Apr. 1, 2009.
U.S. Appl. No. 11/232,588—Final Office Action dated Nov. 27, 2009.
U.S. Appl. No. 10/961,793—Non-Final Office Action dated Jun. 24, 2009.
U.S. Appl. No. 10/961,793—Final Office Action dated Feb. 4, 2010.
U.S. Appl. No. 10/961,911—Non-Final Office Action dated Jun. 8, 2009.
U.S. Appl. No. 10/961,911—Non-Final Office Action dated Feb. 3, 2010.
U.S. Appl. No. 10/962,103—Non-Final Office Action dated Aug. 14, 2009.
U.S. Appl. No. 11/232,827—Final Office Action dated Jun. 4, 2009.
U.S. Appl. No. 11/232,827—Non-Final Office Action dated Dec. 1, 2009.
U.S. Appl. No. 11/073,055—Non-Final Office Action dated Jun. 19, 2009.
U.S. Appl. No. 11/073,055—Final Office Action dated Feb. 18, 2010.
U.S. Appl. No. 11/233,202—Non-Final Office Action dated Jun. 9, 2009.
U.S. Appl. No. 11/233,202—Final Office Action dated Jan. 15, 2010.
U.S. Appl. No. 11/233,201—Final Office Action dated Apr. 28, 2009.
U.S. Appl. No. 11/233,201—Non-Final Office Action dated Sep. 4, 2009.
U.S. Appl. No. 11/232,552—Final Office Action dated Jun. 24, 2009.
U.S. Appl. No. 11/232,552—Non-Final Office Action dated Dec. 24, 2009.
U.S. Appl. No. 11/233,270—Final Office Action dated Mar. 31, 2009.
U.S. Appl. No. 11/233,270—Final Office Action dated Nov. 27, 2009.
U.S. Appl. No. 11/465,699—Non-Final Office Action dated Sep. 17, 2008.
U.S. Appl. No. 11/465,699—Final Office Action dated Mar. 31, 2009.
U.S. Appl. No. 11/465,699—Final Office Action dated Nov. 27, 2009.
U.S. Appl. No. 11/465,722—Non-Final Office Action dated Dec. 24, 2009.
U.S. Appl. No. 11/241,501—Final Office Action dated May 13, 2009.
U.S. Appl. No. 11/241,501—Non-Final Office Action dated Feb. 9, 2010.
U.S. Appl. No. 11/241,497—Non-Final Office Action dated Oct. 6, 2009.
U.S. Appl. No. 11/241,011—Final Office Action dated Apr. 2, 2009.
U.S. Appl. No. 11/241,011—Non-Final Office Action dated Jan. 4, 2010.
U.S. Appl. No. 11/241,010—Final Office Action dated Mar. 20, 2009.
U.S. Appl. No. 11/241,071—Non-Final Office Action dated Aug. 19, 2009.
U.S. Appl. No. 11/241,447—Non-Final Office Action dated Jul. 22, 2009.
U.S. Appl. No. 11/241,498—Non-Final Office Action dated Dec. 10, 2009.
U.S. Appl. No. 11/240,039—Final Office Action dated Apr. 13, 2009.
U.S. Appl. No. 11/240,039—Non-Final Office Action dated Nov. 3, 2009.
U.S. Appl. No. 11/240,156—Non-Final Office Action dated Sep. 16, 2009.
U.S. Appl. No. 11/255,611—Notice of Allowance dated Aug. 10, 2009.
U.S. Appl. No. 11/256,479—Final Office Action dated Apr. 1, 2009.
U.S. Appl. No. 11/256,479—Non-Final Office Action dated Nov. 16, 2009.
U.S. Appl. No. 11/192,617—Non-Final Office Action dated Sep. 29, 2009.
U.S. Appl. No. 11/193,154—Non-Final Office Action dated Jun. 3, 2009.
U.S. Appl. No. 11/193,154—Final Office Action dated Dec. 7, 2009.
U.S. Appl. No. 11/192,630—Final Office Action dated Sep. 2, 2009.
U.S. Appl. No. 11/192,546—Final Office Action dated Jun. 30, 2009.
U.S. Appl. No. 11/192,546—Non-Final Office Action dated Nov. 24, 2009.
U.S. Appl. No. 11/193,077—Notice of Allowance dated Mar. 11, 2008.
U.S. Appl. No. 11/192,870—Non-Final Office Action dated Jul. 17, 2009.
U.S. Appl. No. 11/192,870—Final Office Action dated Jan. 4, 2010.
U.S. Appl. No. 11/192,865—Non-Final Office Action dated Aug. 20, 2009.
U.S. Appl. No. 11/192,836—Notice of Allowance dated Dec. 30, 2008.
U.S. Appl. No. 11/192,616—Non-Final Office Action dated Sep. 17, 2009.
U.S. Appl. No. 11/193,147—Notice of Allowance dated Dec. 30, 2008.
U.S. Appl. No. 11/192,868—Final Office Action dated Aug. 11, 2009.
U.S. Appl. No. 11/192,629—Final Office Action dated Jun. 26, 2009.
U.S. Appl. No. 11/192,629—Non-Final Office Action dated Jan. 15, 2010.
U.S. Appl. No. 11/193,151—Final Office Action dated Sep. 21, 2009.
U.S. Appl. No. 11/193,188—Final Office Action dated Aug. 5, 2009.
U.S. Appl. No. 11/192,824—Non-Final Office Action dated Sep. 18, 2009.
U.S. Appl. No. 11/193,140—Final Office Action dated May 18, 2009.
U.S. Appl. No. 11/193,140—Notice of Allowance dated Jan. 29, 2010.
U.S. Appl. No. 11/192,796—Non-Final Office Action dated Dec. 28, 2009.
U.S. Appl. No. 11/192,615—Non-Final Office Action dated Sep. 4, 2009.
U.S. Appl. No. 11/192,547—Final Office Action dated Jan. 15, 2010.
U.S. Appl. No. 11/192,467—Non-Final Office Action dated Nov. 13, 2009.
U.S. Appl. No. 11/255,333—Notice of Allowance dated Nov. 3, 2009.
U.S. Appl. No. 11/465,747—Non-Final Office Action dated Jun. 24, 2009.
U.S. Appl. No. 11/465,752—Non-Final Office Action dated Jun. 24, 2009.
U.S. Appl. No. 11/241,320—Non-Final Office Action dated Oct. 7, 2009.
U.S. Appl. No. 11/240,139—Non-Final Office Action dated Oct. 6, 2009.
U.S. Appl. No. 11/240,084—Final Office Action dated Apr. 15, 2009.
U.S. Appl. No. 11/240,084—Non-Final Office Action dated Dec. 16, 2009.
U.S. Appl. No. 11/218,033—Final Office Action dated Mar. 30, 2009.
U.S. Appl. No. 11/218,033—Non-Final Office Action dated Sep. 8, 2009.
U.S. Appl. No. 11/218,186—Non-Final Office Action dated Jun. 23, 2009.
U.S. Appl. No. 11/218,186—Final Office Action dated Feb. 1, 2010.

U.S. Appl. No. 11/685,046—Non-Final Office Action dated Jul. 8, 2009.
U.S. Appl. No. 11/685,046—Final Office Action dated Dec. 21, 2009.
JP Patent App. No. 2006-261563—Office Action filed for a related foreign application dated Jan. 19, 2010.
JP Patent App. No. 2006-207199—Office Action filed for a related foreign application dated Feb. 2, 2010.
JP Patent App. No. 2006-058600—Office Action filed for a related foreign application dated Aug. 18, 2009.
JP Patent App. No. 2005-295772—Office Action filed for a related foreign application dated Sep. 15, 2009.
JP Patent App. No. 2005-295772—Notice of Allowance filed for a related foreign application dated Dec. 15, 2009.
JP Patent App. No. 2006-207200—Office Action filed for a related foreign application dated Feb. 2, 2010.
JP Patent App. No. 2006-207194—Office Action filed for a related foreign application dated Jan. 12, 2010.
JP Patent App. No. 2006-261564—Office Action filed for a related foreign application dated Jan. 19, 2010.
JP Patent App. No. 2006-207199—Office Action filed for a related foreign application dated Nov. 17, 2009.
JP Patent App. No. 2007-225913—Office Action filed for a related foreign application dated Dec. 24, 2009.
JP Patent App. No. 2006-256442—Office Action filed for a related foreign application dated Jul. 14, 2009.
JP Patent App. No. 2006-207194—Office Action filed for a related foreign application dated Jun. 23, 2009.
Foreign Patent App. No. JP2006-058600—Office Action filed for a related foreign application dated Aug. 18, 2009 corresponding to U.S. Appl. No. 11/073,055.
Foreign Patent App. No. JP2006-207200—Office Action filed for a related foreign application dated Jun. 1, 2010 corresponding to U.S. Appl. No. 11/192,547.
Foreign Patent App. No. JP2006-207196—Office Action filed for a related foreign application dated Mar. 2, 2010 corresponding to U.S. Appl. No. 11/192,862.
Foreign Patent App. No. JP2006-256441—Office Action filed for a related foreign application dated Mar. 30, 2010 corresponding to U.S. Appl. No. 11/233,202.
Foreign Patent App. No. JP2006-207198—Office Action filed for a related foreign application dated Mar. 2, 2010 corresponding to U.S. Appl. No. 11/192,616.
U.S. Appl. No. 10/961,594—Final Office Action dated Apr. 2, 2010.
U.S. Appl. No. 10/962,103—Non-final Office Action dated May 14, 2010.
U.S. Appl. No. 11/232,827—Final Office Action dated Jun. 14, 2010.
U.S. Appl. No. 11/233,201—Final Office Action dated Jun. 3, 2010.
U.S. Appl. No. 11/232,588—Notice of Allowance dated Jun. 23, 2010.
U.S. Appl. No. 11/233,270—Non-final Office Action dated Jun. 9, 2010.
U.S. Appl. No. 11/465,699—Non-final Office Action dated Nov. 16, 2009.
U.S. Appl. No. 11/465,699—Final Office Action dated May 24, 2010.
U.S. Appl. No. 11/465,722—Final Office Action dated Apr. 30, 2010.
U.S. Appl. No. 11/241,011—Final Office Action dated Jun. 29, 2010.
U.S. Appl. No. 11/241,010—Non-final Office Action dated Apr. 15, 2010.
U.S. Appl. No. 11/241,071—Final Office Action dated Apr. 16, 2010.
U.S. Appl. No. 11/241,447—Final Office Action dated Apr. 1, 2010.
U.S. Appl. No. 11/240,039—Notice of Allowance dated Jun. 3, 2010.
U.S. Appl. No. 11/240,156—Final Office Action dated Mar. 31, 2010.
U.S. Appl. No. 11/256,479—Final Office Action dated May 13, 2010.
U.S. Appl. No. 11/192,617—Final Office Action dated Jun. 11, 2010.
U.S. Appl. No. 11/193,076—Non-final Office Action dated Apr. 5, 2010.
U.S. Appl. No. 11/192,630—Non-final Office Action dated Apr. 9, 2010.
U.S. Appl. No. 11/192,546—Final Office Action dated Jul. 14, 2010.
U.S. Appl. No. 11/192,937—First Action Interview Pilot Program Pre-Interview Communication dated Apr. 7, 2010.
U.S. Appl. No. 11/192,616—Final Office Action dated May 26, 2010.
U.S. Appl. No. 11/192,500—Non-final Office Action dated Jul. 21, 2010.
U.S. Appl. No. 11/192,868—Non-final Office Action dated May 19, 2010.
U.S. Appl. No. 11/193,188—Non-final Office Action dated Apr. 19, 2010.
U.S. Appl. No. 11/192,824—Non-final Office Action dated Mar. 1, 2010.
U.S. Appl. No. 11/192,615—Final Office Action dated Apr. 20, 2010.
U.S. Appl. No. 11/192,547—Non-final Office Action dated Jun. 25, 2010.
U.S. Appl. No. 11/192,467—Final Office Action dated Jun. 25, 2010.
U.S. Appl. No. 11/256,493—Non-final Office Action dated Mar. 9, 2010.
U.S. Appl. No. 11/465,752—Final Office Action dated Apr. 2, 2010.
U.S. Appl. No. 11/241,320—Final Office Action dated Jun. 17, 2010.
U.S. Appl. No. 11/240,139—Final Office Action dated Jun. 9, 2010.
U.S. Appl. No. 11/536,115—Non-final Office Action dated Jun. 15, 2010.
U.S. Appl. No. 11/218,033—Final Office Action dated May 14, 2010.
E. Uemukai Toshiaki, A WWW Browsing System in Remote Display Environments, IPSJ magazine, Information Processing Society of Japan, Publication Date: Sep. 15, 2000, vol. 41, No. 9, p. 2364 to 2373.
Foreign Patent App. No. JP2006256440—Office Action filed for a related foreign application dated Jun. 7, 2010 corresponding to U.S. Appl. No. 11/233,270.
Foreign Patent App. No. JP2006261564—Office Action filed for a related foreign application dated Jun. 15, 2010 corresponding to U.S. Appl. No. 11/241,010.
Foreign Patent App. No. JP2006207195—Office Action filed for a related foreign application dated Jul. 27, 2010 corresponding to U.S. Appl. No. 11/192,617.
U.S. Appl. No. 10/962,248—Final Office Action dated Aug. 17, 2010.
U.S. Appl. No. 10/961,594—Non-Final Office Action dated Sep. 15, 2010.
U.S. Appl. No. 11/233,202—Non-Final Office Action dated Jul. 27, 2010.
U.S. Appl. No. 11/233,201—Non-Final Office Action dated Sep. 15, 2010.
U.S. Appl. No. 11/232,552—Final Office Action dated Aug. 19, 2010.
U.S. Appl. No. 11/241,501—Final Office Action dated Jul. 22, 2010.
U.S. Appl. No. 11/241,497—Notice of Allowance dated Aug. 11, 2010.
U.S. Appl. No. 11/241,498—Final Office Action dated Jul. 22, 2010.
U.S. Appl. No. 11/192,862—Non-Final Office Action dated Jul. 26, 2010.
U.S. Appl. No. 11/192,937—Notice of Allowance dated Sep. 7, 2010.
U.S. Appl. No. 11/192,865—Final Office Action dated Mar. 4, 2010.
U.S. Appl. No. 11/192,865—Non-Final Office Action dated Sep. 2, 2010.
U.S. Appl. No. 11/192,629—Final Office Action dated Aug. 25, 2010.
U.S. Appl. No. 11/192,796—Notice of Allowance dated Sep. 10, 2010.
U.S. Appl. No. 11/256,493—Final Office Action dated Aug. 20, 2010.
U.S. Appl. No. 11/240,084—Final Office Action dated Aug. 6, 2010.

* cited by examiner

US 7,978,618 B2

METHODS AND SYSTEMS FOR USER INTERFACE CUSTOMIZATION

RELATED REFERENCES

This application is a continuation-in-part of U.S. patent application Ser. No. 10/962,248, entitled "Methods and Systems for Imaging Device Remote Application Interaction," filed on Oct. 8, 2004; this application is also a continuation-in-part of U.S. patent application Ser. No. 10/961,793, entitled "Methods and Systems for Imaging Device Remote Form Management," filed on Oct. 8, 2004; this application is also a continuation-in-part of U.S. patent application Ser. No. 10/961,911, entitled "Methods and Systems for Imaging Device Remote Location Functions," filed on Oct. 8, 2004; this application is also a continuation-in-part of U.S. patent application Ser. No. 10/961,594, entitled "Methods and Systems for Imaging Device Document Management," filed on Oct. 8, 2004; and this application is also a continuation-in-part of U.S. patent application Ser. No. 10/962,103, entitled "Methods and Systems for Imaging Device Document Translation," filed on Oct. 8, 2004.

FIELD OF THE INVENTION

Embodiments of the present invention comprise methods and systems for user interface customization.

BACKGROUND

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

SUMMARY

Some embodiments of the present invention comprise methods and systems for user interface customization based on user login.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 15:
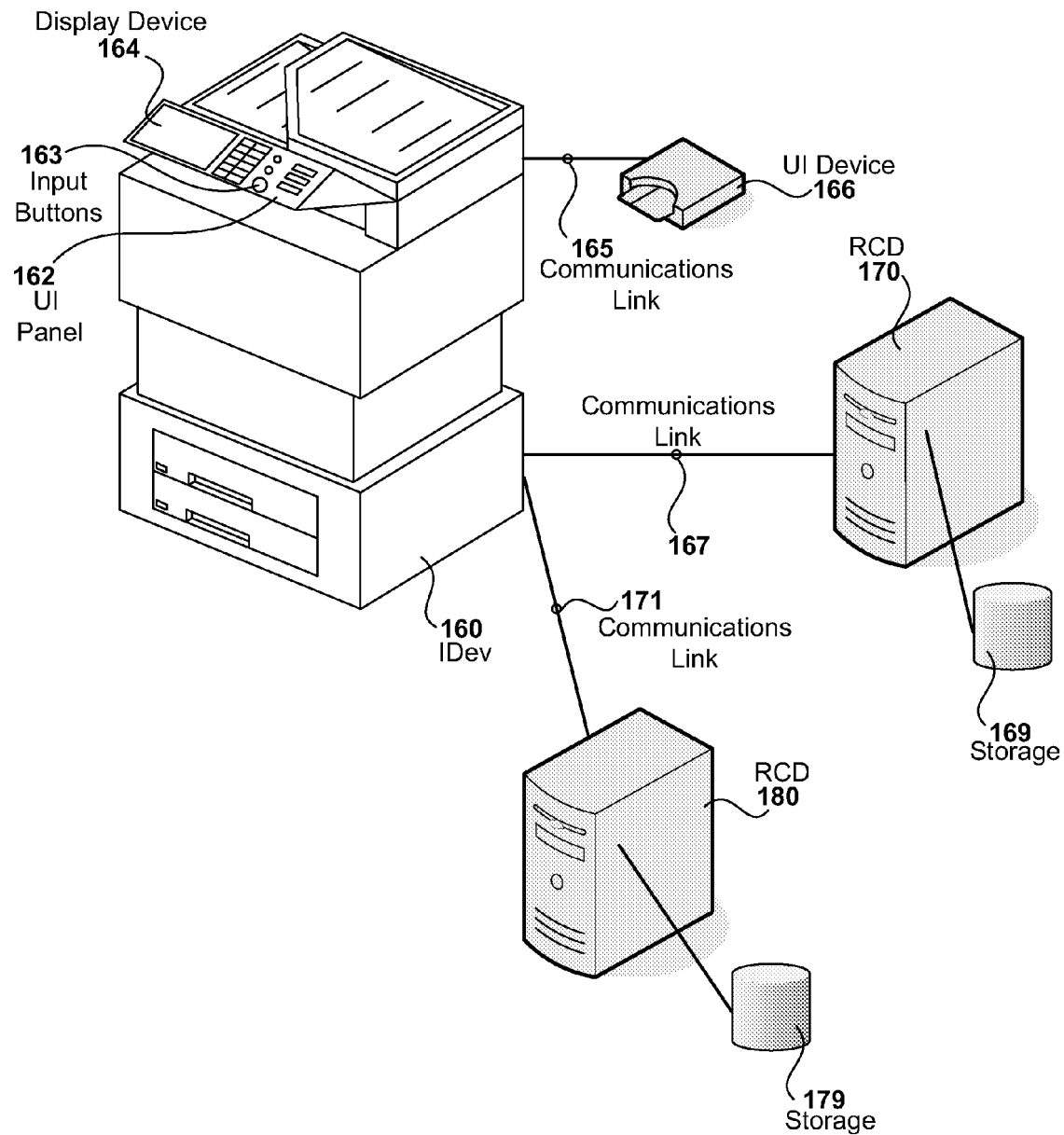
Figure 16:
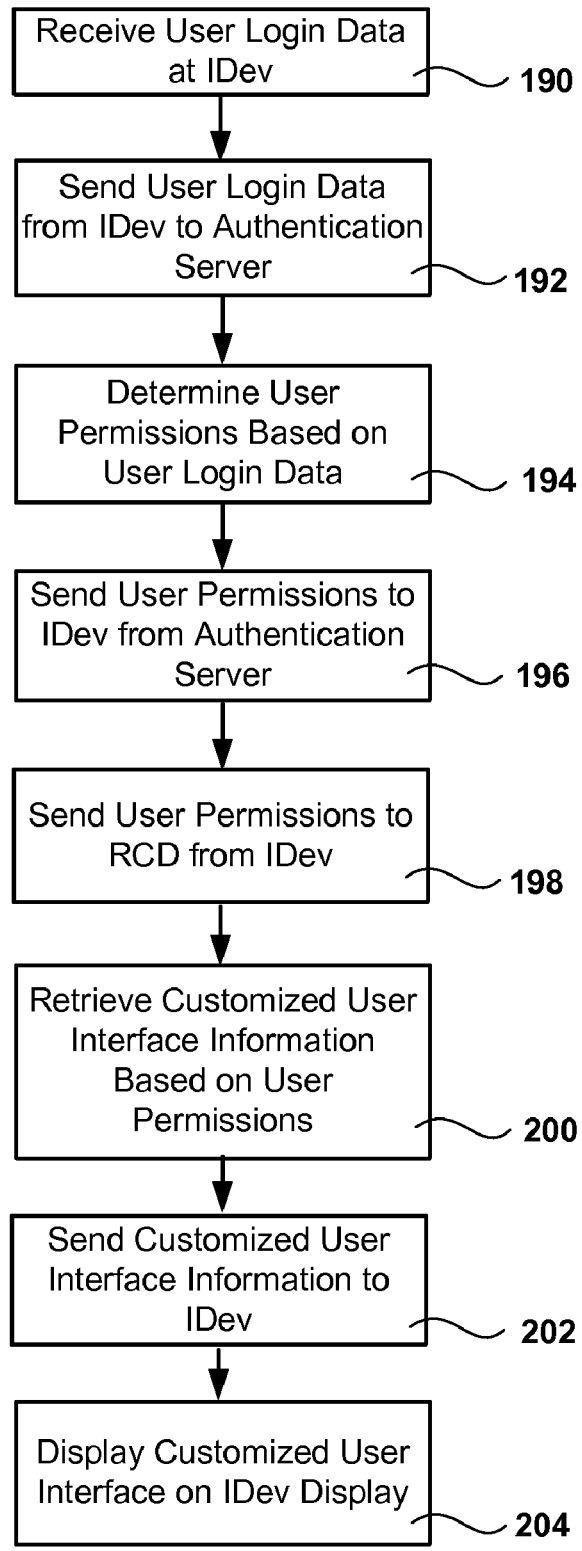

FIG. 15 is a diagram showing an exemplary embodiment of the present invention comprising an imaging device in connection with a remote computing device and an authentication server; and FIG. 16 is a chart showing embodiments comprising a remote computing device sending customized-user-interface data based on user permissions to an imaging device wherein the imaging device has received the user permissions from an authentication server.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

U.S. patent application Ser. No. 10/962,248, entitled "Methods and Systems for Imaging Device Remote Application Interaction," filed on Oct. 8, 2004 is hereby incorporated herein by reference. U.S. patent application Ser. No. 10/961,793, entitled "Methods and Systems for Imaging Device Remote Form Management," filed on Oct. 8, 2004 is hereby incorporated herein by reference. U.S. patent application Ser. No. 10/961,911, entitled "Methods and Systems for Imaging Device Remote Location Functions," filed on Oct. 8, 2004 is hereby incorporated herein by reference. U.S. patent application Ser. No. 10/961,594, entitled "Methods and Systems for Imaging Device Document Management," filed on Oct. 8, 2004 is hereby incorporated herein by reference. U.S. patent application Ser. No. 10/962,103, entitled "Methods and Systems for Imaging Device Document Translation," filed on Oct. 8, 2004 is hereby incorporated herein by reference.

Embodiments of the present invention comprise interfaces and architectures that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary IDevs comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions, comprising a printer, scanner, copier and/or a facsimile machine or image transmitter/receiver is a type of IDev. Other MFP IDevs may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an IDev. Some exemplary RCDs are network servers, networked computers and other processing and storage devices that have communications links.

Figure 1:
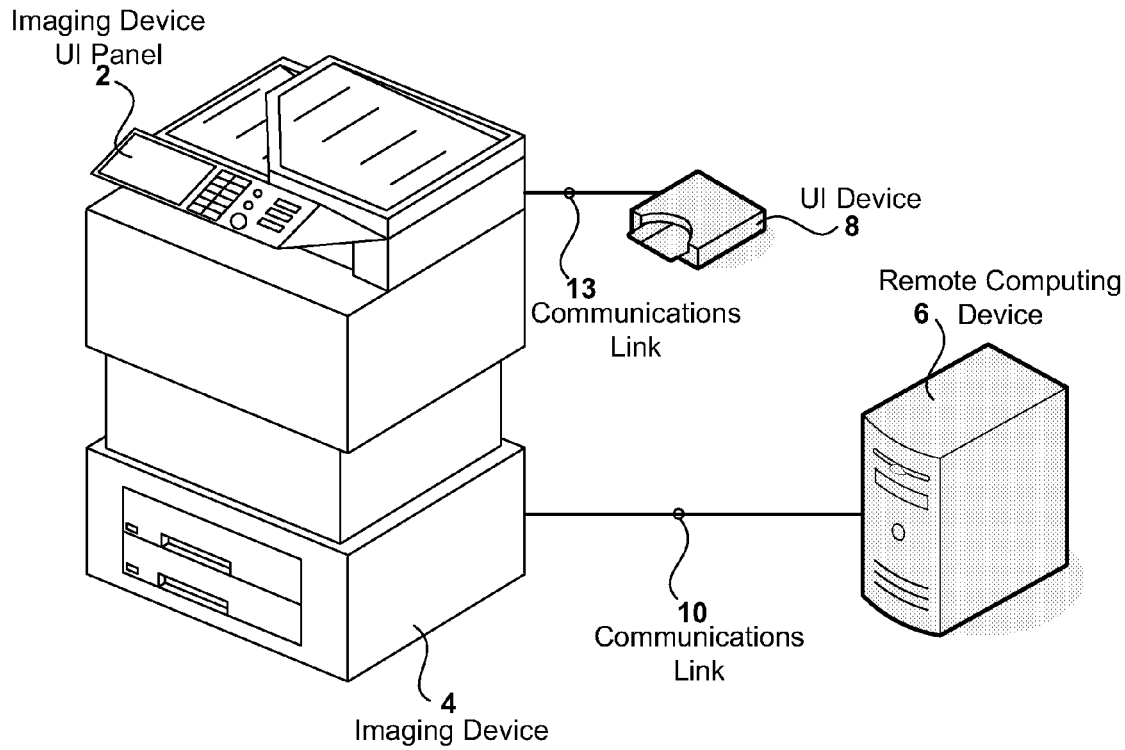
FIG. 1 is a diagram of an embodiment of the present invention comprising an imaging device in connection with a remote computing device.
Figure 2:
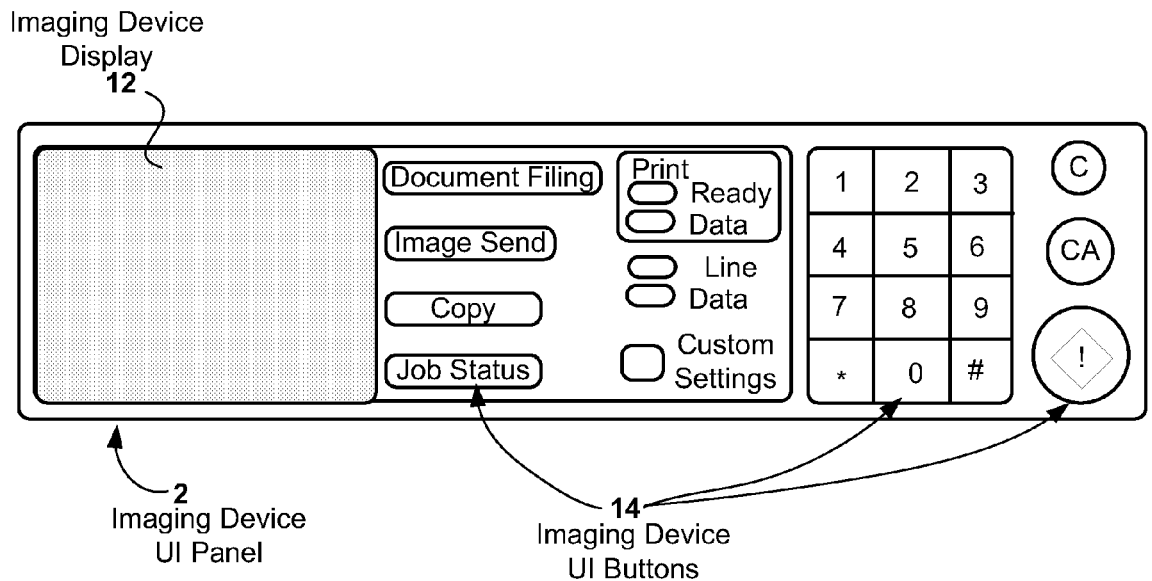
FIG. 2 is an image of an exemplary user interface for an imaging device.

Some embodiments of the present invention may be described with reference to FIG. 1 and FIG. 2. These embodiments comprise an IDev 4 that may be a multi-function peripheral device (MFP) or a single-function device. The IDev 4 further comprises a user interface (UI) panel 2, which may comprise input buttons 14 and a display device 12 or may comprise a touch panel system with or without buttons 14. User input and display may also be performed through a separate UI device 8, which may be connected to the IDev 4 by a communication link 13, such as a Universal Serial Bus (USB) connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other portable or fixed storage devices that may be configured to store input for transfer to an IDev.

These embodiments further comprise an RCD 6 that is linked to the IDev 4 via a communications link 10, such as a network connection. This network connection may be a typical wired connection or a wireless link.

Embodiments of the present invention may provide menu data from the RCD 6 to the IDev UI panel 2 or remote panel 8 via the network connection 10. Once this menu data is transferred to the IDev 4, a UI panel 2, 8 on the IDev 4, or connected to the IDev 4, may be used to interact with applications that run on the RCD 6. User input received from UI panels 2, 8 may be returned directly to the RCD 6.

A Web Service is a software application identified by a Uniform Resource Identifier (URI), whose interfaces and binding are capable of being defined, described and discovered by Extensible Markup Language (XML) artifacts and supports direct interactions with other software applications using XML-based messages via Internet-based protocols.

An application on the RCD 6 may use one or more Web Services to control various features in the IDev 4, such as enabling, disabling or setting device values or controlling device functions. In some embodiments of the present invention, an application on the RCD 6 may retrieve customized UI information based on a user login and transmit the information to the IDev 4 in order to effectuate presentation of a customized UI on a display panel 2 at the IDev 4 or a display panel 8 connected to the IDev 4.

Embodiments of the present invention allow network applications running on RCDs to interact with the user of the IDev through the IDev I/O panel. These embodiments allow IDev UI control (e.g., touch panel, button/display) by applications. Some embodiments may also integrate custom display screens or menus with the native IDev UI. Embodiments may hand off control of IDev functions between standard operation modes performed on the IDev in response to user input to an IDev UI and open systems modes that utilize network resources, such as applications on RCDs, through user input at the IDev UI.

Embodiments of the present invention comprise network-based applications that have full control over the IDev UI to display text and graphics in any format. In these embodiments, the application can programmatically display buttons, textboxes, graphics, etc. in any layout desired. In some embodiments of the present invention, the display of buttons, textboxes, graphics, and other UI components may be displayed according to a user-based customization.

In some embodiments, the UI layout may be programmed using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention an RCD application or server application is able to request a keyboard UI to be displayed on the IDev display 12, 8. In some embodiments, this functionality is available on the IDev and does not need to be recreated by RCD applications. In some embodiments, the RCD may define the keyboard prompt and default values. These embodiments may comprise an RCD that is able to rename IDev UI buttons, such as the "OK" and "Cancel" buttons as well as define additional buttons.

In some embodiments, menu templates may be served to the IDev UI by the IDev itself 4 or from an RCD 6.

External Authorization Application

Some embodiments of the present invention may comprise an RCD application that is registered as the External Authorization server. The External Authorization application may control access to the IDev and may have top-level control of the UI. UI control may be given to this application in the same manner that control is given to an internal auditor.

In these embodiments, when an IDev system boots, it checks to see if an External Authorization application is registered. If so, the IDev is placed in disabled mode and the External Authorization application is contacted to take control of the UI. If the External Authorization server is not available, an error message may be displayed and the device may remain disabled. The IDev may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device - standard Job Status screens | Job Status |
| Custom Settings | Device - standard Custom Settings screens | N/A |
| OS Mode | Not available when device is disabled | |

RCD Applications

In embodiments of the present invention, access to the custom UI panels of IDevs may vary from application to application. Some solutions, such as document management integration, may wish to leverage the native "Image Send" screens, but display some custom UI's to gather additional information about a scan job. Other solutions, like custom printing applications, may be accessed from a separate mode than the native functions.

In order to accommodate the diversified needs of the applications associated with these solutions, embodiments may support multiple integration points for UI control. These integration points are based on a user action ("trigger") for which applications may register. In some embodiments, applications may be registered with target devices so that the device knows that when, for example, "trigger A" occurs on the front panel to contact "RCD B" for instructions. In exemplary embodiments, applications may be integrated with an IDev at any of several "trigger" points.

RCDs may be registered to a specific function and contacted when that function's hardware key is pressed (e.g., Image Send) on the IDev UI. Any UI information provided by the RCD may be displayed instead of the standard function screens native to the IDev. This trigger may be used for applications that wish to replace the existing functions with completely custom UIs, such as an alternative scan solution or a specialized display, such as a "Section 508" compatible screen or other specialized-need interface that may have large buttons or other accommodations. In some embodiments, the completely custom UIs may be based on user login information.

In some embodiments, each function on the IDev may have a menu on the touch screen that RCDs, such as servers, can register. This enables solutions applications to provide custom content and still use some of the standard functionality provided by the IDev. When a button assigned to a custom application is selected, a menu will be displayed with the solutions registered to that function. Users may select the desired solution and the RCD will be contacted for instructions.

In some embodiments, a stand-alone RCD mode that provides RCD application access can be accessed from the job queue portion of the UI that is displayed on every screen. This trigger point may be used for applications that do not fit within one of the standard device functions, such as custom printing solutions on an IDev. When the RCD menu is selected, a menu will be displayed with the solutions applications registered to the generic RCD mode. Users will select the desired solution and the RCD will be contacted for instructions.

Hardware Key Interaction

In some embodiments of the present invention, when an IDev is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings & UI location | Move to Job Status, maintain current settings & UI location |
| Clear (C) | Clears settings | Sends clear event to external application |
| Clear All (CA) | Clears settings, cancels job, and returns to default IDev screen | Cancels job and returns to default IDev screen (notification sent to external application) |

**When External

TABLE 2-continued

Exemplary Hardware Key Assignments

| Button Press | Standard IDev Mode | RCD Mode |
|---|---|---|
| Start | Initiates scan function | Authorization is controlling the UI, only notification is sent Initiates scan function |
| Number keys | Input for copy count or fax numbers | Not used |
| * | Logs user out (disable device and contact External Authorization for screens) | Logs user out (disable device and contact External Authorization for screens) |

In some embodiments, in addition to the "*" key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact an RCD to retake control of the UI.

Error and Jam Notifications

Depending on a particular solution, an RCD application may have full or only partial control of the IDev UI and a particular imaging job. In some embodiments, partial control may include cases where an RCD is monitoring clicks, but native modes are responsible for the UI interaction and controlling the job. Partial control may also include cases where the RCD application is integrated with a native mode (UI trigger=function custom menu). In these embodiments, the IDev may handle all error and jam notifications with only a notification sent to the relevant RCD application.

For some embodiments, in cases where the RCD application has full control over the UI and the job, error and jam notifications may be handled differently depending on the type of error. For recoverable errors, a notification may be sent to the RCD application and the application may be responsible for displaying messages and resolving the error. For non-recoverable errors, the IDev and RCD mode may interact to gracefully handle the error condition (e.g., provide user with instructions for clearing jam).

Control Handoffs

In some embodiments, at different points throughout an imaging job, several applications may need control over an IDev including, but not limited to, an External Authorization application, a standard RCD application, an IDev native mode and other applications. The following section describes, for an exemplary embodiment, the various steps in an exemplary job, the entities that may have control during each step, and what type of control may be allowed.

Step 1: User provides credentials to access the device at the device UI. This step may be controlled by an RCD, such as an External Authorization application or by Internal Accounting (native mode) in the IDev itself. At the end of this step, the device is enabled. The External Authorization application may also specify default parameters or disable specific job parameters (e.g., default file format is PDF, but user may change; color mode is set to B/W and user may not change).

Step 2: User sets parameters for the job using one of the native IDev modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native "Image Send" screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. An RCD application may also want to retake control of the UI at this point, if, as in some embodiments, the application generates thumbnails of the scanned images and displays them to the user for verification.

Step 3: Once the job is initiated, the IDev is responsible for scanning or RIPing the job and spooling it to the HDD. If the IDev is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the IDev. For example, a government office may have a custom encryption application running on the device that takes the scanned document, encrypts it, and then requests the IDev to send it to the target destination selected by the user in step 2. In some embodiments, it may be beneficial to send a notification to the external authorization application after this step—because the IDev does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow an RCD application to control access to an IDev for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/Disable Device of Function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
| --- | --- |
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report Clickes Used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
| --- | --- | --- | --- | --- | --- | --- | --- |
| JOB Characteristics | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| PAGE Characteristics | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1 - Yes when Document Filing is used

Debit Mode—in these embodiments, when an application enables the device it may specify if the current job requires authorization. If so, the job will be spooled to memory and click information (e.g., as defined in Table 4) will be sent to an RCD. The RCD will then notify the device if the job should be deleted or output/sent. At this point, the application also has the option of changing job parameters. If the application does not require authorization, the job will continue as normal and a click report will be sent at the end of the job.

Print Job Accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or to cancel the job.

Report on Unidentified Jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the IDev. In exemplary embodiments, the Device Management API may provide an RCD with the following controls:

Device Status—an RCD may request the current status of the device. This is the same status information as reported on the embedded web pages.

Device Configuration—an RCD can retrieve a list of installed options supported by the device.

Web Page Settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click Counts—an RCD application can retrieve device total counts and clicks for each function by account code.

Data Security Settings—an RCD application may retrieve the status information on the DSK (e.g., last erase) and initiate data clear functions.

Red Data—an RCD can retrieve all data typically sent in a RED message.

Remote Reboot—an RCD can initiate a reboot of the IDev.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow an RCD application to configure internal accounting and report click counts. In some exemplary embodiments an Internal Accounting API may include:

Set Auditing Options—an RCD may set auditing options including which modes auditing is enabled for, "account number security," and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form Management API, which allows an RCD application to remotely download and manage fonts and forms in mass-storage. In some exemplary embodiments, a Font and Form Management API may provide an RCD with the following controls:

Mass Storage Control—an RCD application can retrieve mass storage status information including storage capacity, space available, and write-protect mode plus modify write-protect status.

Resource List—an RCD application can retrieve a list of stored fonts and forms including font or macro ID, font number, font/form name, escape sequence, and file size.

Download Resource—an RCD application can download PCL fonts, PCL macros, and PS fonts and forms. Any special processing that is performed when a resource is downloaded via the web pages will also be performed when the resource is downloaded via Open Systems.

Delete Resource—an RCD application can delete any resource stored in mass storage.

Upload Resources—an RCD application can upload an individual or all resources. On devices where effective memory management is unavailable, a server application can use this function to "defrag" mass storage.

Font/Macro ID's—an RCD application can assign or modify the ID's assigned to PCL fonts and macros.

Firmware Management API

In some embodiments of the present invention, a Firmware Management API may allow an RCD or network application to remotely download and manage the IDev firmware. In some exemplary embodiments, a Firmware Management API may provide an RCD (e.g., a server) with the following controls:

Firmware Versions—an RCD application can retrieve the current firmware version numbers.

Service Mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.

Update Firmware—an RCD can download an updated firmware version to the device. If a reboot is necessary, the IDev will perform it automatically when download is complete.

Download Status—the IDev will send a status notification (success/error) to an RCD after firmware download.

Revert to Previous Version—if firmware update is not successful, the application can request the IDev to revert to the previous firmware version.

Device Function API's

In some embodiments of the present invention, device function API's allow an RCD application to use existing IDev functionality to provide new custom solutions.

Image Send API

In some embodiments, an Image Send API may provide the RCD application with the following controls:

Image Send Parameters—an RCD application can get and set values for the following scan and fax parameters:

Color or B/W

Image Mode—Text, Text/Photo, Photo; Exposure Level

Resolution

File Format—File Type, Compression, and Pages Per File

Original—Size, Simplex/Duplex, Rotate, and Job Build

Filename

Subject

Message

Sender

Schedule Send Time

Page Dovosopm (Book Scanning)

Cover Page

Transmission Message (Confidential, Urgent, Etc.)

Thin Paper Scanning

Destination

Document Filing

Initiate Scan—the RCD application can initiate the scan function (same as user pressing start button).

In some embodiments, an RCD can change the default values on the IDev or the values for the current job. For the current job, the RCD may also specify if scan parameters may be modified by the user or not. If one RCD application (e.g., Access Control) specifies that a parameter cannot be changed and then a second application (e.g., Document Management) tries to set the parameter, a notification may be sent to the second application and the setting will not be changed.

Print API

In some embodiments, print jobs may be submitted by RCD applications using standard printing channels. In some exemplary embodiments, a Print API may provide an RCD with the following additional control:

Pjl Sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide an RCD with the following exemplary controls:

Copy Parameters—an RCD application can get and set values for the following copy parameters:

Color or B/W

Exposure—Text, Text/Photo, Photo, Super Photo; Exposure Level

Paper Select (by TRAY)

Copy Ratio

2-Sided Copy—1to1, 1to2, 2to2, 2to1; Binding Edge

Output—Output Tray, Sort, Staple, Group, Offset

Original Sizw

Special Function—Margin Shift, Erase, Pamphlet, etc.

Document Filing

Initiate Copy—and RCD application can initiate the copy function (same as user pressing start button).

In some embodiments, an RCD can change the default values on the IDev or the values for the current job. For the current job, the RCD may also specify if copy parameters may be modified by the user or not.

Document Filing API

In some embodiments of the present invention, a Document Filing API may provide an RCD with the following exemplary controls:

Backup/Restore—RCD application can import and export a batch file with all Document Filing data. In some embodiments, this package will be in a proprietary format since it contains documents that are password-protected and should not be accessed individually—this is typically for restore in case of failure or cloning to other devices.

File/Folder List—the RCD application can retrieve, modify, and create new files and folders to be stored on the IDev (also covered in device management).

Download File—the RCD can download a new file to the Document Filing systems and specify folder, filename, username, and password.

User List—the RCD application can retrieve, modify, and create new users to be stored on the IDev (also covered in device management).

Hdd Status—the RCD application can retrieve the current HDD status including the percentage allocated to the main folder, quick folder, and custom folders and the percentage remaining.

Doc Filing Parameters—the RCD application can get and set values for storing a file to Doc Filing including:
  Exposure
  Resolution
  Original—Size, Simplex/Duplex
  File Information—Username, Filename, Folder, Confidential, Password
  Special Modes—Erase, Dual Page Copy, 2IN1, Job Build, Card Shot Initiate Print—the RCD application can select a stored file and initiate a print including the following parameters:
  Paper Size/Source
  Output—Sort/Group, Output Tray, Staple, Punch, Offset
  Simplex/Duplex (Tablet/Booklet)
  Tandem Print
  Number of Copies
  Delete or Store After Printing Initiate Send—the RCD application can select a stored file and initiate a send including the following parameters:
  Resolution
  File Format
  Destination
  Timer
  Sender
  Filename
  Subject
  Message Security Allowing external applications to control an IDev opens up the IDev to new security vulnerabilities. In embodiments of the present invention that provide some security measures, the following exemplary items are security concerns that may be addressed by the RCD interface.

Access to RCD interfaces may be limited to valid applications. Embodiments provide extensive access and control of the IDev, which poses a significant security risk. The interface of these embodiments may be protected from access by attackers, while maintaining ease of setup and use for valid solutions.

Confidential data (e.g., user credentials and job data) may be protected during network transfer. User credentials and job data may be secured during network transfer to ensure that it cannot be stolen, an intruder cannot monitor device activity, and a man-in-the-middle attack cannot change messages. IDevs may support Secure Sockets Layer (SSL) and other connections to ensure data is safe while being communicated between the IDev and RCD applications.

Administrators may have the ability to lock-down IDev access. For users with strict security policies, administrators may have the ability to disable access by RCDs or limit access to specific applications. Administrators may have an option to register the limited applications that they wish to access the IDev interfaces.

RCD applications may ensure the IDev is not being "spoofed." The RCD may be able to authenticate an IDev that it is contract with it to ensure that an intruder cannot imitate the IDev to collect network configuration and password information, monitor file/folder structures of a document management system, or spoof security settings and DSK status of the IDev.

An RCD may ensure that the server is not being "spoofed." The IDev must be able to authenticate all RCDs that it is in contact with to ensure that an intruder is not spoofing the RCD's IP address. By pretending to be the RCD, an intruder could steal user credentials, redirect scanned documents, change device settings or firmware, or bring down the access control system (either to provide access to unauthorized users or initiate a denial of service attack for valid users).

Access control/vend applications may not be compromised when an RCD is unavailable. When the RCD is unavailable, it may not be acceptable to provide open access to the device. If the RCD is unavailable at startup or becomes unavailable at anytime (e.g., someone disconnects a network cable), the IDev may immediately be disabled and an error message displayed.

An administrator may be able to adjust a security level based on company and application requirements. Security requirements can have a large impact on the time it takes to develop an RCD application and the resources required to implement the solution. Users using some embodiments may range from a small business with one IDev, no IT staff, and a simple scan or print application to a large government office using access control and audit trails to track all device activity. The security measures used to protect IDev interfaces may be adjustable by the administrator to match the target environment.

The IDev and RCD applications may be able to hand-off user credentials. Users may be prompted to login at multiple points throughout a job. For example, an access control application or accounting application may control total device access, the IDev may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an IDev only, which is configured to interact with an RCD, such as a server, through a communications link. The IDev 30 comprises a user interface 32, which comprises a user input device 34, such as a keypad, one or more buttons, knobs or switches or a touch-screen panel, and a display 36, which may comprise user input device 34 in the form of a touch-screen panel.

IDev 30 will typically be capable of performing one or more imaging functions including, but not limited to, scanning, printing, copying, facsimile transmission (sending and receiving) and others.

Figure 3:
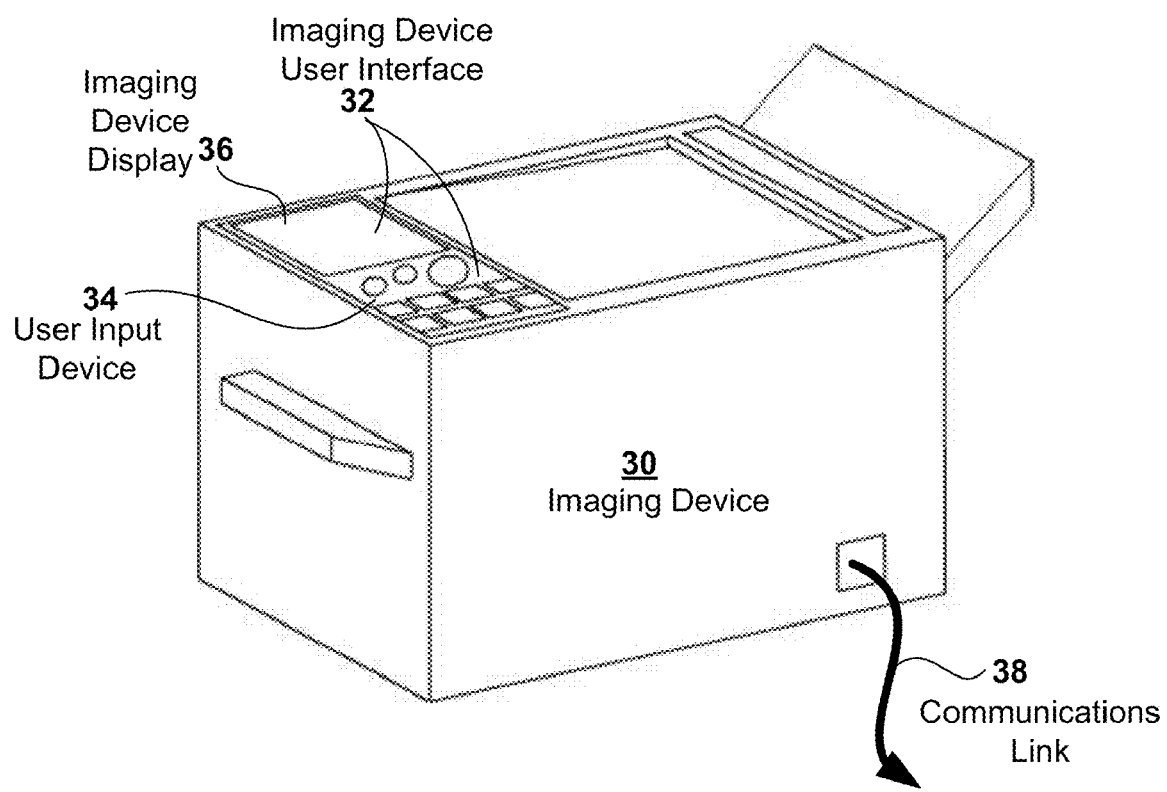
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11 (b) compliant connection, a Bluetooth connection, an Infrared Data Association (IrDA) connection or some other wireless connection.

Figure 4:
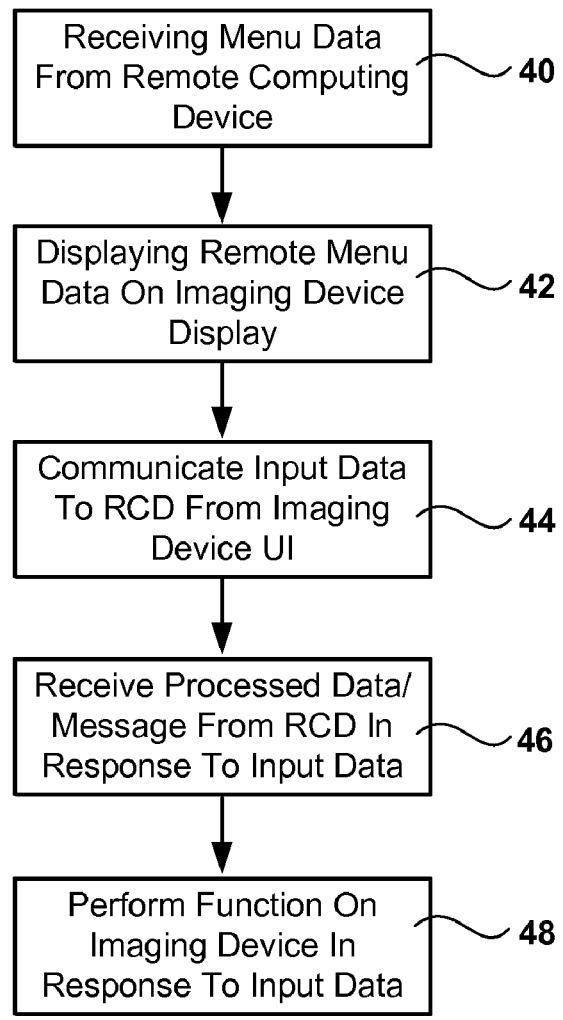
FIG. 4 is a chart depicting steps of an imaging device method.

The operation of some IDev embodiments may be explained with reference to FIG. 4. In these embodiments, menu data is received 40 from an RCD (not shown in FIG. 3), which is connected to the IDev 30 via the communication link 38 through a wired or wireless connection. This menu data is then displayed 42 on the IDev user interface display 36. This display of remote menu data is intended to prompt a user to make an input on the user interface input device 34.

IDevs of these embodiments are further configured to accept input from a user in response to a display of remote menu data and communicate 44 that user input to an RCD. In some embodiments, this user input data will be processed by an RCD. This may comprise running an application on the RCD. This processing may also comprise accessing and communicating data that is stored on the RCD.

The IDevs of these embodiments are further configured to receive 46 data resulting from processing the user input data. This may comprise data generated by an application running on the RCD in response to the user input. The IDev may also receive data that was stored on an RCD, such as a file server, in response to processing the user input.

Once the IDev 30 has received 46 the processed data, the IDev 30 may perform 48 a native function in response to the data or using the data. For example, and not be way of limitation, the IDev 30 may print a document that was stored on the RCD and modified on the RCD according to the user input. As another non-limiting example, the IDev 30 may activate or enable functions (e.g., scanning, copying, printing, fax transmission) on the IDev in response to the receipt 46 of processed data.

Figure 5:
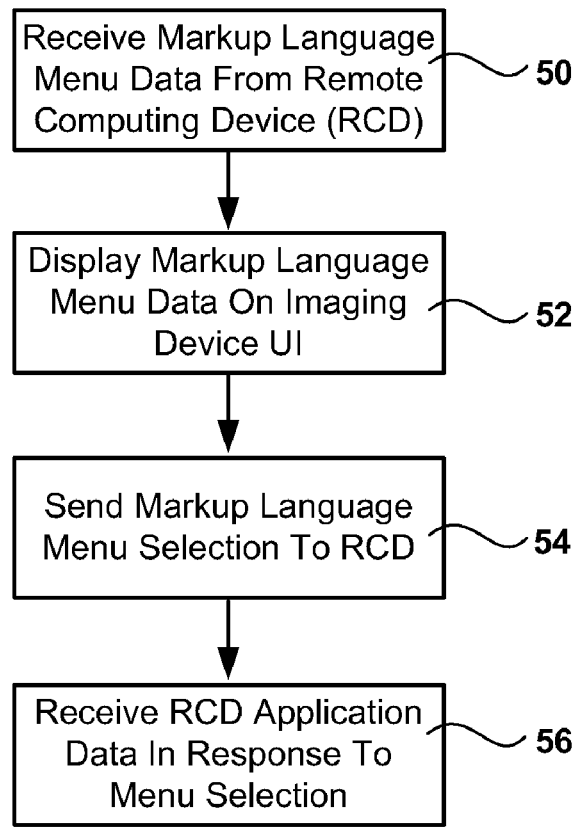
FIG. 5 is a chart depicting steps of an imaging device method using a markup language.

Some, more specific, IDev embodiments may be explained with reference to FIG. 5. In these embodiments, the IDev 30 is configured to receive 50 menu data formatted in a markup language from an RCD. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the IDev user interface display 36. As in previously described embodiments, the menu data is typically intended to prompt user input on IDev user interface 32. Display 52 of the remotely-stored menu data may be accomplished with a browser application that is native to the IDev 30.

In these embodiments, the IDev 30 is further configured to route 54 user input received though its user interface 32 to an RCD. The RCD that receives the user input may then run an application or otherwise process the user input and return the results of the processing to the IDev 30. Accordingly, the IDev 30 is further configured to receive 56 processed data from an RCD. In some embodiments, the IDev 30 may perform one or more functions in response to the receipt 56 of processed data.

Figure 6:
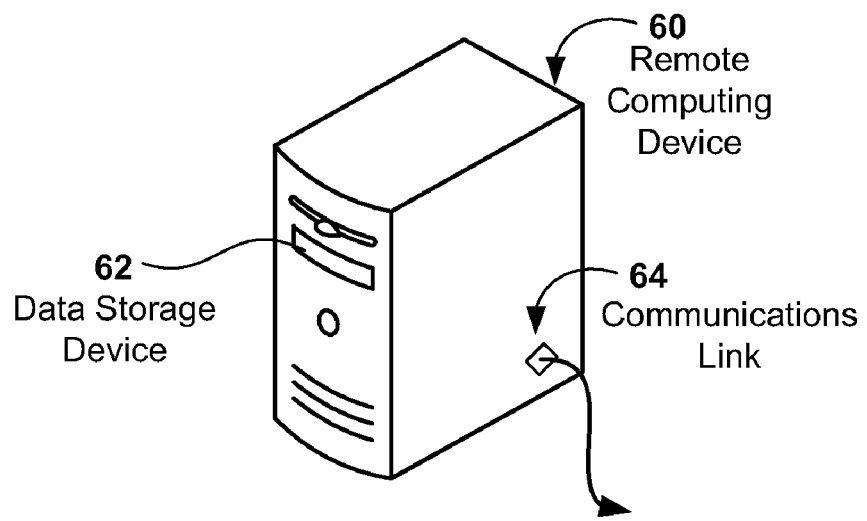
FIG. 6 shows an exemplary remote computing device embodiment.

Some embodiments of the present invention may be explained with reference to FIG. 6. These embodiment comprise an RCD 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IRDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
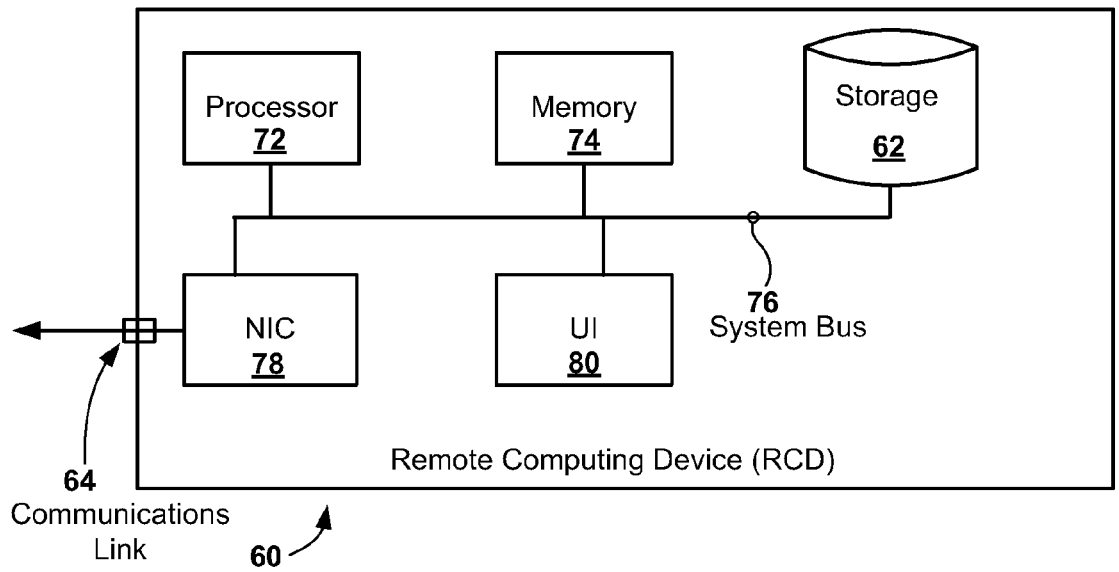
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. The RCD 60 may further comprise memory 74, which may be in the form of Random Access Memory (RAM) and Read Only Memory (ROM). Generally, any applications processed by processor 72 will be loaded into memory 74. The RCD 60 may further comprise a network interface 78, which allows the RCD 60 to communicate with other devices, such as an IDev 30. In some embodiments, the RCD 60 may also comprise a user interface 80, but this is not required in many embodiments. Storage 62 may be used to store applications and data that may be accessed by an IDev 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
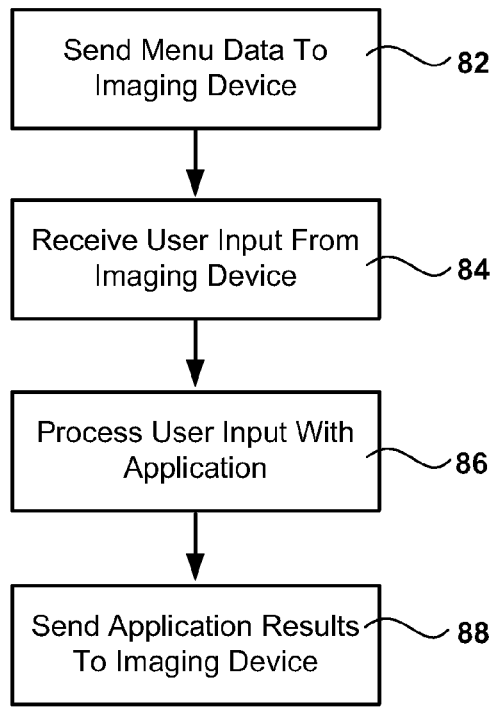
FIG. 8 is a chart showing steps of a remote computing device method.

In some embodiments, described with reference to FIG. 8, an RCD 60 may comprise menu data stored on storage device 62 or in memory 74. This menu data may be configured for display on an IDev user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an IDev 30. Accordingly, menu data configured for display on an IDev 30 is stored on an RCD 60.

An RCD 60, of some embodiments, will be further configured to receive 84 user input obtained through the user interface 32 of an IDev 30 and transferred to the RCD 60 over communications links 38 and 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the IDev 30 where the processed output may be used in an IDev process or function.

Figure 9:
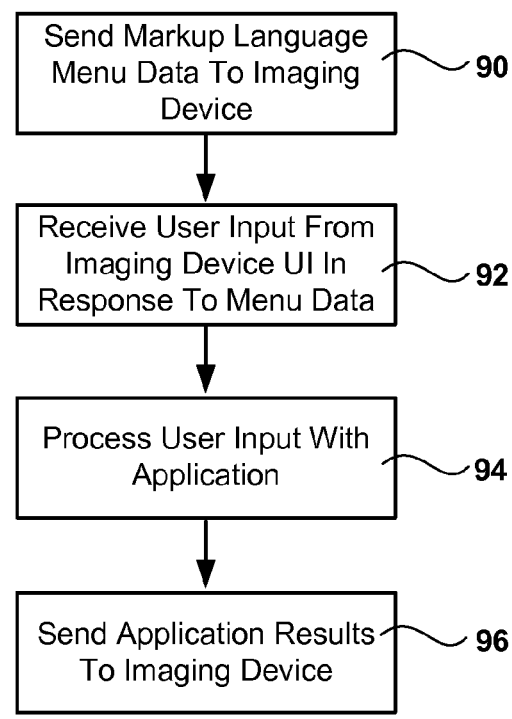
FIG. 9 is a chart showing steps of a remote computing device method using a markup language.

In some embodiments, as described with reference to FIG. 9, an RCD 60 may send 90 menu data configured for an IDev display 36 using a markup language. The markup language menu data is then received at the IDev 30 and displayed to a user. Typically, this will prompt the user to enter an input on the IDev user interface 32. This user input will then be sent by the IDev 30 to the RCD 60. The RCD 60 will then receive 92 the input data prompted by the display of the menu data on the IDev 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
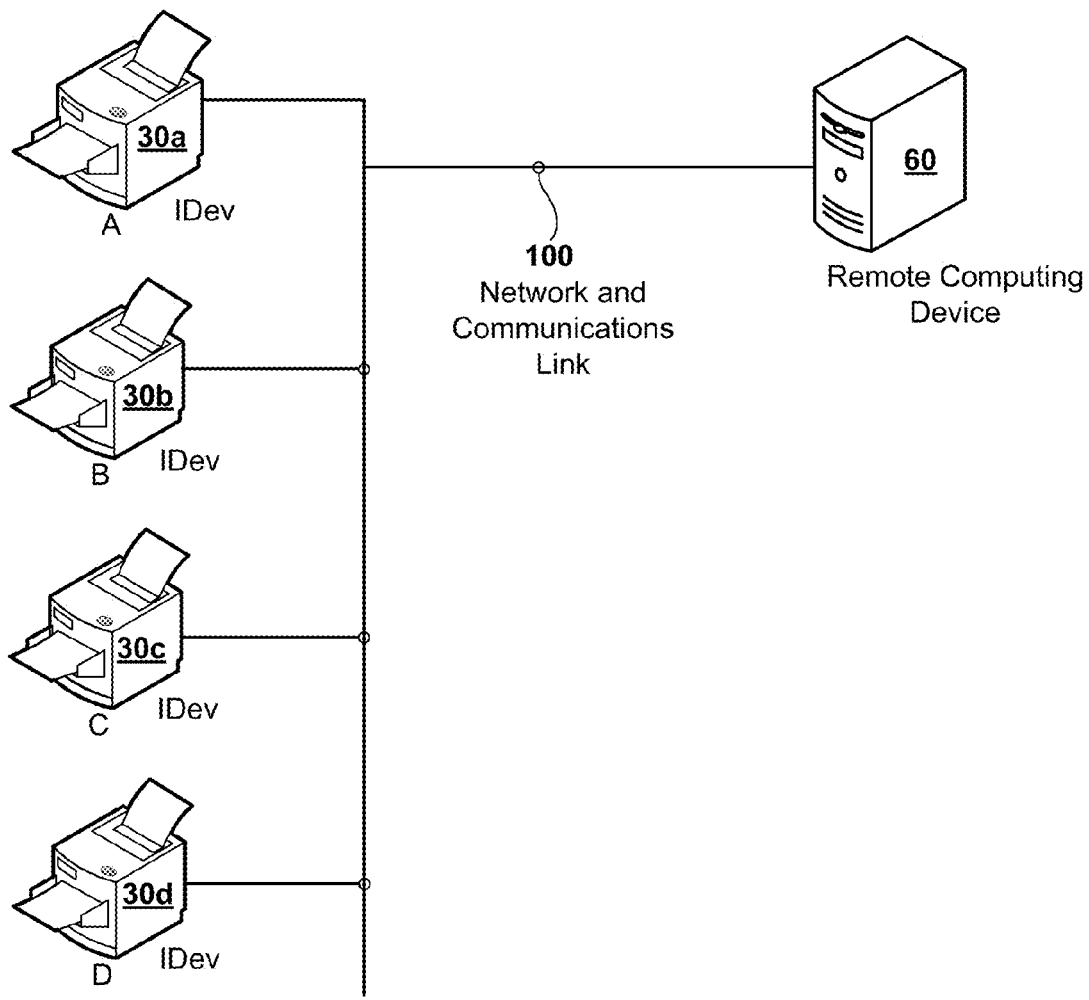
FIG. 10 is a diagram showing a system comprising multiple imaging devices in connection with a remote computing device.
Figure 11A:
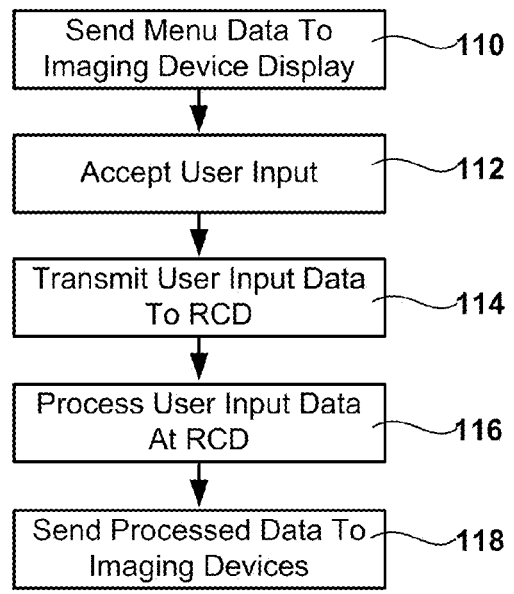
FIG. 11A is a chart showing steps of a method that may be employed by the system depicted in FIG. 10.
Figure 11B:
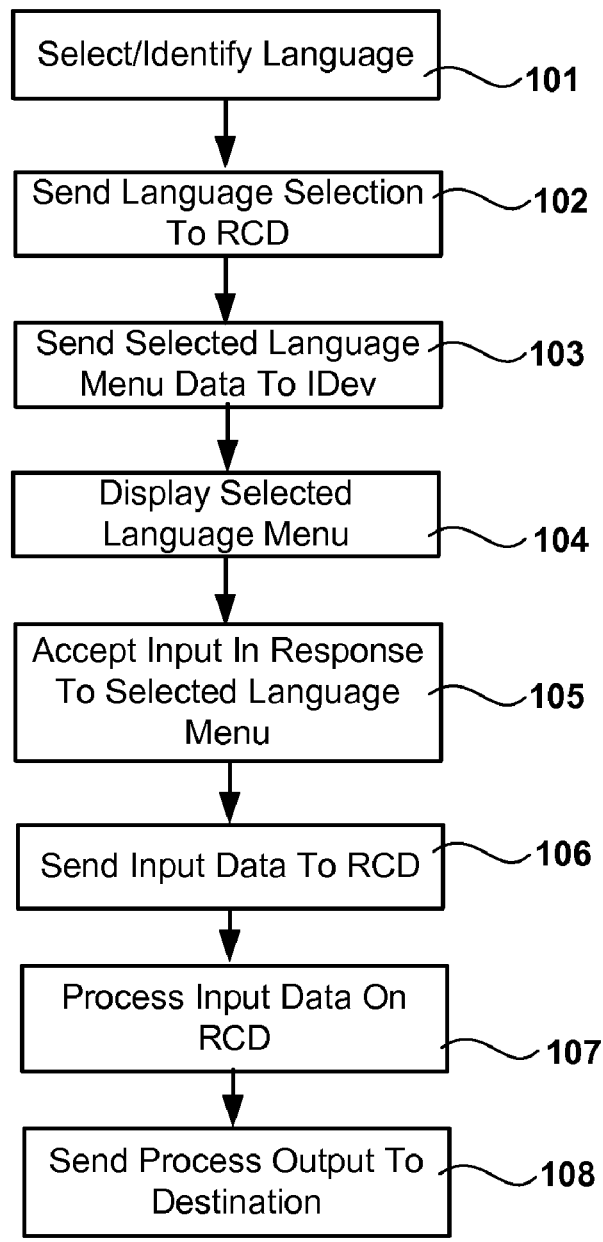
FIG. 11B is a chart showing embodiments comprising multi-language support.

Some embodiments of the present invention may be described with reference to FIG. 10 and FIG. 11. These embodiments comprise at least one RCD 60 and a plurality of IDevs 30*a*-30*d*. In these embodiments, at least one of the IDevs 30*a*-30*d* comprises a user interface 32 with a display 36 and user input panel 34 that is integral with the display (e.g., touch-screen) or a separate input unit. RCD 60 is connected to IDevs 30*a*-30*d* by a communications link and network 100 to enable data transmission between RCD 60 and IDevs 30*a*-30*d*.

In these embodiments, menu data is stored on RCD 60 and sent 110 to at least one of the IDevs 30*a*-30*d* where the menu data is displayed on a user interface. Any of IDevs 30*a*-30*d* that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the IDevs 30*a*-30*d*.

In these embodiments, a single RCD 60 may be used to provide processing power, resources and functionality to a plurality of IDevs 30*a*-30*d* without reproducing these resources in each IDev. In some embodiments, data generated by input on one IDev 30*a* may be directed to another IDev 30*d* for processed data output or final processing.

Some embodiments of the present invention may comprise multi-language menu support. Some of these embodiments, illustrated in FIG. 11B, allow for an initial selection or identification 101 of a user-preferred language. This selection may comprise user input to select a preferred language. This step may also comprise an automatic identification of a user-preferred language which may be achieved by a user identification profile linked to a language, a language identification based on the text of a scanned document, a code printed on a scanned document or some other identification scheme.

Once the language has been selected or otherwise identified, the selection/identification data is sent 102 to an RCD 60, where the selection is used to identify language-specific menu data that is sent 103 to the IDev 30 for display 104. A user may then respond to the selected-language menu data with input 105, which may be used to invoke native IDev functions or may be sent 106 to the RCD 60 for any necessary processing. An RCD 60 may then process 107 the input data and send 108 any process input to a destination, such as the IDev 30, an e-mail address, a memory location or some other destination.

User Interface Customization

Figure 12:
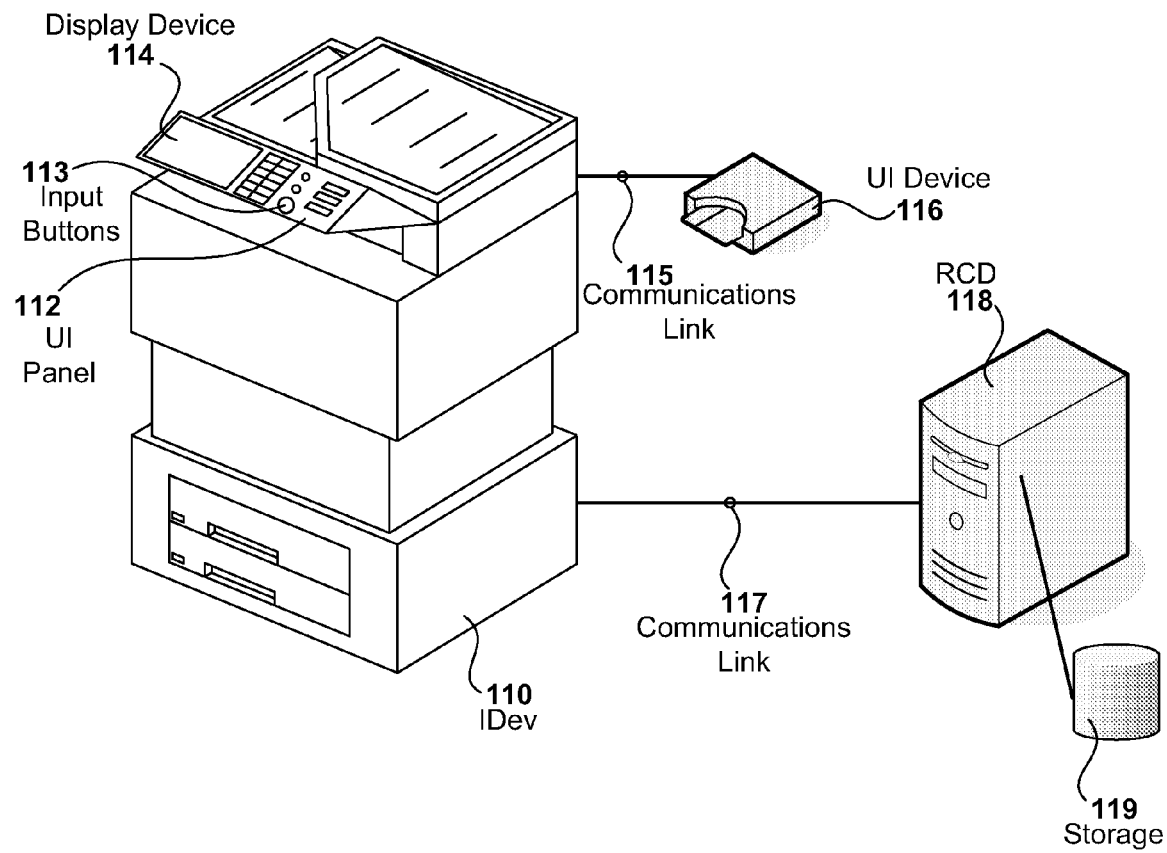
FIG. 12 is diagram showing an exemplary embodiment of the present invention comprising an imaging device in connection with a remote computing device.

In some embodiments of the present invention, customized-user-interface information may be sent to an IDev from an RCD. Some of these embodiments may be described with reference to FIG. 12. These embodiments comprise an IDev 110 that may be a multi-function peripheral device (MFP) or a single-function device. The IDev 110 may comprise a user interface (UI) panel 112. The UI panel 112 may comprise input buttons 113 and a display device 114, or the UI panel 112 may comprise a touch panel system with or without buttons 113. The touch panel system may function as both an input device and a display device 114. User input and display may also be performed through a separate UI device 116, which may be connected to the IDev 110 by a communication link 115, such as a Universal Serial Bus (USB) connection, a network cable, a wireless connection or some other communications link. The separate UI device 116 may or may not comprise a display or a touch panel system with or without buttons.

These embodiments further comprise an RCD 118 that is linked to the IDev 110 via a communications link 117, such as a network connection. This network connection may be a typical wired connection or a wireless link. The RCD 118 may have access to storage 119 that may, in some embodiments, reside on the RCD 118, and in alternative embodiments, may reside external to the RCD 118.

In some embodiments, the IDev 110 may expose an application programming interface (API) that may allow an application resident on the RCD 118 to gather user credentials (also considered login information or login data) through the front panel of the IDev 110. In some embodiments, a user may log into the IDev 110 using the front panel 114. In alternate embodiments, a user may log into the IDev 110 using the separate UI device 116. Exemplary separate UI devices 116 may comprise a card reader, a biometric device, a panel similar in function to the IDev 110 front panel 112, or any other device capable of input and/or output. Login data may be sent, via the communications link 117 to the RCD 118. Exemplary login data may comprise user name, user password, user permissions, user personal identification number, user biometric data, user credentials, or other user-identifying data. Based on the login data, the RCD 118 may access the storage 119 to obtain customized-user-interface information associated with the login data. The customized-user-interface information may comprise, for example, user interface content, user interface format, user interface language and other parameters, preferences, and information required to display or otherwise present a custom user interface.

A customized user interface may be generated by a user, a system administrator or any other person associated with the user and the IDev 110. In some embodiments, the customized user interface may comprise a user's preferences or functional needs. The customized user interface may, in alternative embodiments, comprise an interface to the most recently accessed functions by the user. The customized user interface may in some embodiments reflect restrictions on the IDev functions available to the user. In some embodiments, the customized user interface may comprise the language preference of the user.

Some embodiments of the present invention comprise a user interface customization tool. The user interface customization tool may comprise methods and systems for defining user information and associated user interface preferences. The user interface customization tool may also comprise storage for the user information and associated user interface preferences. The user interface customization tool may be used to define user preference data or customized user interfaces. User preference data may be used to fill-in portions of a user interface template thereby generating a customized user interface. Exemplary user preferences may include user interface language, output file format and output file destination path. Customized user interfaces may define the content and layout of each user interface screen. In some embodiments, a customized user interface may show a limited set of predefined, standard, user interface components in a preferred layout. In alternative embodiments, a customized user interface may show user interface components, for example, buttons, dialog boxes, and other user interface components, associated with specific tasks and parameters. In some embodiments, the user interface customization tool may also associate the user login information or data that may be used to associate user interface information with a user. In some embodiments, the user interface customization tool may comprise a database manager for managing and storing user preference data or customized user interfaces.

The RCD 118 may send the customized-user-interface information via the communications link 117 to the IDev 110. The customized-user-interface information may comprise, in some embodiments, user interface screens which may be displayed on the IDev 110 display device 114, which in some embodiments may comprise a touch panel. In other embodiments, the user interface screens may be displayed on the separate UI device 116, which in some embodiments may comprise a touch panel. In some embodiments, the user interface screens may comprise web pages that may be displayed using a web browser embedded in the IDev 110. In some embodiments of the present invention, the web pages may comprise instructions written in a markup language.

The IDev 110 may display a customized user interface comprising the customized-user-interface information. The logged-in user may then interact with the IDev 110 and the RCD 118 through the customized user interface presented on the IDev 110 display device 114 or the separate UI device 116. The input received through the customized user interface may be sent to the RCD 118 through the communications link 117. The RCD 118 may process the input and send a processed message or data to the IDev 110. The IDev 110 may perform a function in response to the received processed message or data. In some embodiments, the function may effectuate the presentation of an additional page of the customized user interface on the IDev 110 display device 114 or the separate UI device 116.

Figure 13:
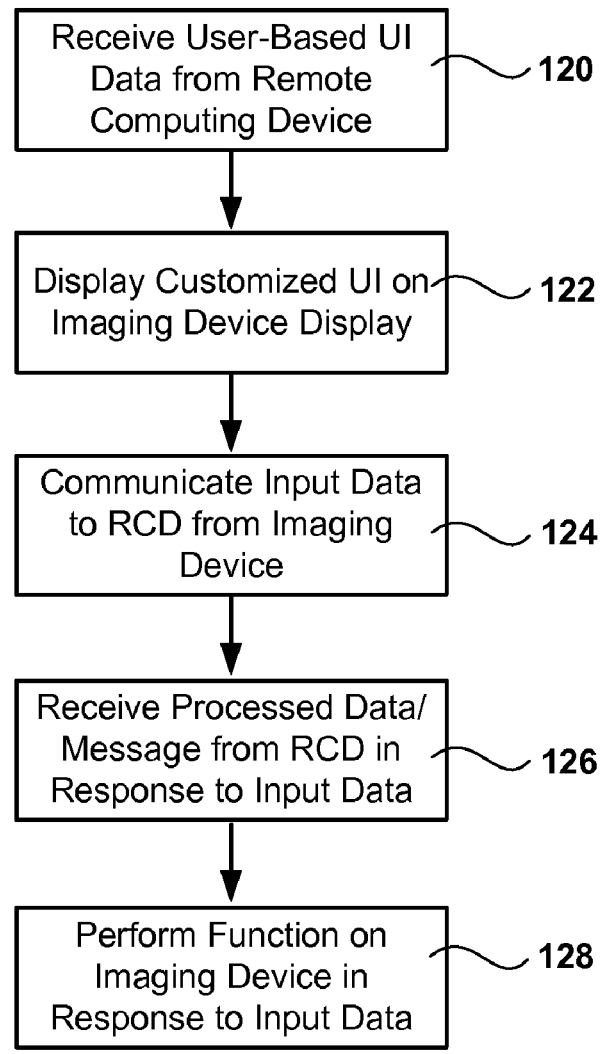
FIG. 13 is a chart showing embodiments comprising an imaging device with a customized user interface.

The operation of some IDev 110 embodiments may be explained with reference to FIG. 13. In these embodiments, user-based, customized-user-interface data (also considered information) is received 120 at the IDev 110 from the RCD 118. This customized-user-interface data is then displayed 122 on the IDev 110 user interface display 114 or 116. The display of the user interface is intended to prompt a user to make an input on the user interface input device, either the display device 114, the separate UI device 116, or the front panel 112 buttons 113.

IDevs 110 of these embodiments may be configured to accept input from a user in response to the display of the customized user interface and communicate 124 that user input to the RCD 118. In some embodiments, this user input data will be processed by the RCD 118. This may comprise running an application on the RCD 118. This processing may also comprise accessing and communicating data that is stored on the RCD 118.

The IDevs 110 of these embodiments are further configured to receive 126 data resulting from processing the user input data. This may comprise data generated by an application running on the RCD 118 in response to the user input. The IDev 110 may also receive data that was stored on an RCD 118, such as a file server, in response to processing the user input.

Once the IDev 110 has received 126 the processed data, the IDev 110 may perform 128 a native function in response to the data or using the data. For example, and not be way of limitation, the IDev 110 may print a document that was stored on the RCD 118 and modified on the RCD 118 according to the user input. As another non-limiting example, the IDev 110 may activate or enable functions (e.g., scanning, copying, printing, fax transmission) on the IDev 110 in response to the receipt 126 of processed data.

Figure 14:
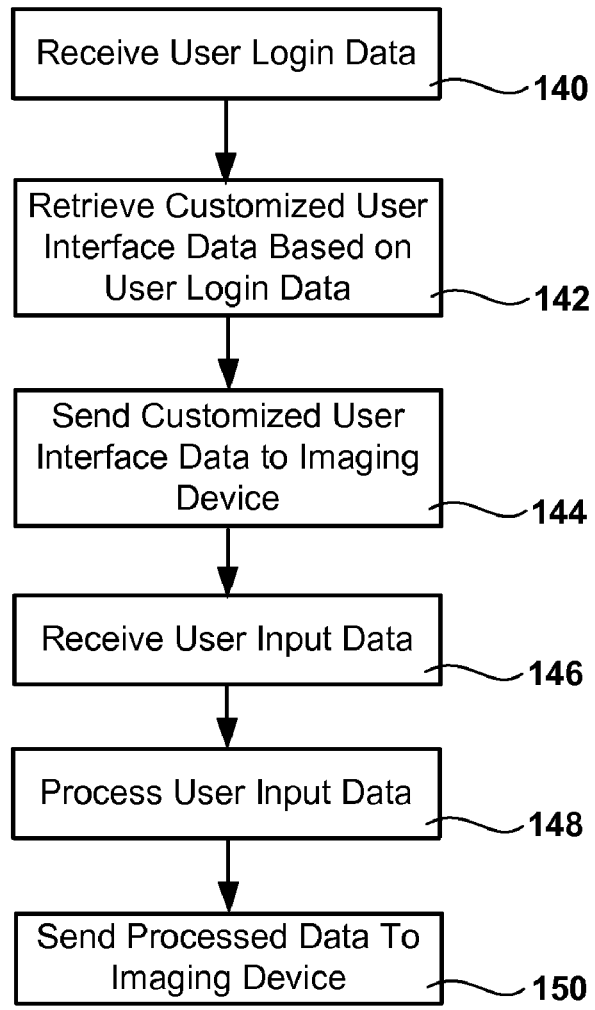
FIG. 14 is a chart showing embodiments comprising a remote computing device sending customized-user-interface data to an imaging device.

In some embodiments, described with reference to FIG. 14, an RCD 118 may comprise customized-user-interface data stored on storage device 119 or in memory. This customized-user-interface data may be configured for display on an IDev 110 user interface 114 or 116. Customized-user-interface data may be stored in many formats and configurations. In some embodiments customized-user-interface data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages.

In these embodiments, the RCD 118 may receive 140 user login data from the IDev 110 via the communications link 117. The RCD 118 may then retrieve 142 from the storage device 119 or memory the customized-user-interface data associated with the user login data. The customized-user-interface data may be sent 144 through the communications link 117 to the IDev 110 from the RCD 118.

The RCD 118, of some embodiments, will be further configured to receive 146 user input obtained through the customized user interface of the IDev 110 and transferred to the RCD 118 over communications links 117. Once this input data is received at an RCD 118, the input data may be processed 148. This processing 148 may comprise conversion of the data to a new format, execution of commands contained within the data or some other process. Once the input data has been processed 148, the processed output may be sent 150 back to the IDev 110 where the processed output may be used in an IDev 110 process or function.

Alternative embodiments of the present invention may be described with reference to FIG. 15. These embodiments comprise an IDev 160 that may be a multi-function peripheral device (MFP) or a single-function device. The IDev 160 may comprise a user interface (UI) panel 162. The UI panel 162 may comprise input buttons 163 and a display device 164, or the UI panel 162 may comprise a touch panel system with or without buttons 163. The touch panel system may function as both an input device and a display device 164. User input and display may also be performed through a separate UI device 166, which may be connected to the IDev 160 by a communication link 165, such as a Universal Serial Bus (USB) connection, a network cable, a wireless connection or some other communications link. The separate UI device 166 may or may not comprise a display or a touch panel system with or without buttons.

These embodiments further comprise an authentication server 170 that is linked to the IDev 160 via a communications link 167, such as a network connection. This network connection may be a typical wired connection or a wireless link. The authentication server 170 may have access to storage 169 that may, in some embodiments, reside on the authentication server 170, and in alternative embodiments, may reside external to the authentication server 170.

In some embodiments, a user may log into the IDev 160 using the front panel 162. In alternate embodiments, a user may log into the IDev 160 using the separate UI device 166. Login data may be sent, via the communications link 167, to the authentication server 170. Login data may comprise user name and permissions. Based on the login data, the authentication server 170 may access the storage 169 to obtain user permissions associated with the login data. The user permission may be sent, via the communications link 167, to the IDev 160.

These embodiments further comprise an RCD 180 that is linked to the IDev 160 via a communications link 171, such as a network connection. This network connection may be a typical wired connection or a wireless link. The RCD 180 may have access to storage 179 that may, in some embodiments, reside on the RCD 180, and in alternative embodiments, may reside external to the RCD 180. The user permission may be sent, via the communications link 171, from the IDev 160 to the RCD 180.

Based on the user permission, the RCD 180 may access the storage 179 to obtain customized-user-interface information associated with the user permission. The customized-userinterface information may comprise, for example, user interface content, user interface format, user interface language and other parameters, preferences, and information required to generate a custom user interface.

A customized user interface may be generated by a user, a system administrator or any other person associated with the user and the IDev 160. In some embodiments, the customized user interface may comprise a user's preferences or functional needs. The customized user interface may, in alternative embodiments, comprise an interface to the most recently accessed functions by the user. The customized user interface may in some embodiments reflect restrictions on the IDev functions available to the user. In some embodiments, the customized user interface may comprise the language preference of the user.

The RCD 180 may send the customized-user-interface information via the communications link 171 to the IDev 160. The customized-user-interface information may comprise, in some embodiments, user interface screens which may be displayed on the IDev 160 display device 164, which in some embodiments may comprise a touch panel. In other embodiments, the user interface screens may be displayed on the separate UI device 166, which in some embodiments may comprise a touch panel. In some embodiments, the user interface screens may comprise web pages that may be displayed using a web browser embedded in the IDev 160. In some embodiments of the present invention, the web pages may comprise instructions written in a markup language.

The IDev 160 may display a customized user interface as determined by the customized-user-interface information. The logged-in user may then interact with the IDev 160 and the RCD 180 through the customized user interface presented on the IDev 160 display device 164 or the separate UI device 166. The input received through the customized user interface may be sent to the RCD 180 through the communications link 171. The RCD 180 may process the input and send a processed message or data to the IDev 160. The IDev 160 may perform a function in response to the received processed message or data. In some embodiments, the function may effectuate the presentation of an additional page of the customized user interface on the IDev 160 display device 164 or the separate UI device 166.

Some embodiments of the present invention may be described with reference to FIG. 16. In these embodiments, user login data may be received 190 at an IDev 160, for example, when a user logs into the IDev. The user login data may be sent 192 from the IDev 160 to an authentication server 170. The authentication server 170 may determine 194 user permissions based on the user login data. In some embodiments, the authentication server 170 may access a database or other data structure 169 stored externally or internally to determine 194 the user permissions. The authentication server 170 may send 196 the user permissions to the IDev 160. The IDev 160 may then send 198 the user permissions to an RCD 180. In some embodiments, the RCD 180 may be a user interface server. The RCD 180 may retrieve 200 customized-user-interface information based on the user permissions. In some embodiments, the RCD 180 may access a database or other data structure 179 stored externally or internally to retrieve 200 the customized-user-interface information. The RCD 180 may then send 202 the customized-user-interface information to the IDev 160.

The IDev 160 may display 204 a customized user interface on the IDev 160 display device 164 or the separate UI device 166 according to the customized-user-interface information received from the RCD 180. The customized-user-interface information may comprise, in some embodiments, user interface screens which may be displayed on the IDev 160 display device 164, which in some embodiments may comprise a touch panel. In other embodiments, the user interface screens may be displayed on the separate UI device 166, which in some embodiments may comprise a touch panel. In some embodiments, the user interface screens may comprise web pages that may be displayed using a web browser embedded in the IDev 160. In some embodiments of the present invention, the web pages may comprise instructions written in a markup language. Customized-user-interface data may be stored in many formats and configurations. In some embodiments customized-user-interface data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for interacting with an imaging device, said method comprising:
    a. sending user-specific login data from said imaging device to a remote computing device;
    b. receiving, at said imaging device from said remote computing device, user-interface information for an application residing on said remote computing device, wherein said user-interface information is associated with said user-specific login data, said user-interface information is related to generating a custom user interface for said application, and said user-interface information is related to at least one user-interface customization preference selected from a group consisting of a user-interface display format, a user-interface language, a user-interface parameter, a user-interface display preference, a user-interface display component, a user-interface display-component layout, a user-interface screen, a user-interface associated with at least one function associated with said imaging device, wherein said at least one function is a most recently accessed function associated with said user-specific login data and a user-interface format; and
    c. displaying, on a local display panel associated with said imaging device, formatted user-interface content, wherein said formatted user-interface content is determined by said user-interface information.

2. The method according to claim 1, wherein said display panel is a touch panel.

3. The method according to claim 1, wherein said display panel is integral to said imaging device.

4. The method according to claim 1, wherein said display panel is separate from said imaging device.

5. The method according to claim 1, wherein said user-interface information comprises at least one web page.

6. The method according to claim 5, wherein said at least one web page is written in a markup language.

7. The method according to claim 1 further comprising detecting a user input at said imaging device.

8. The method according to claim 7 further comprising sending an indication of said user input from said imaging device to said remote computing device.

9. The method according to claim 8 further comprising receiving application data from said remote computing device at said imaging device, wherein said application data is data processed by said application on said remote computing device in response to said user input.

10. The method according to claim 9 wherein said application data initiates an imaging device function.

11. A method for interacting with an imaging device, said method comprising:
   a. sending user-specific login data from said imaging device to an authentication server;
   b. receiving user-specific permission data at said imaging device from said authentication server, wherein said user-specific permission data is associated with said user-specific login data;
   c. sending said user-specific permission data from said imaging device to a remote computing device;
   d. receiving user-interface information at said imaging device from said remote computing device, wherein said user-interface information is associated with said user-specific permission data, said user-interface information is related to generating a custom user interface for said application, and said user-interface information is related to at least one user-interface customization preference selected from a group consisting of a user-interface display format, a user-interface language, a user-interface parameter, a user-interface display preference, a user-interface display component, a user-interface display-component layout, a user-interface screen, a user-interface associated with at least one function associated with said imaging device, wherein said at least one function is a most recently accessed function associated with said user-specific login data and a user-interface format; and
   e. displaying, on a local display panel associated with said imaging device, formatted user-interface content, wherein said formatted user-interface content is determined by said user-interface information.

12. The method according to claim 11, wherein said user-interface information comprises at least one web page.

13. The method according to claim 12, wherein said at least one web page is written in a markup language.

14. The method according to claim 11 further comprising:
   a. detecting a user input at said imaging device;
   b. receiving application data from said remote computing device at said imaging device, wherein said application data is data processed by an application on said remote computing device in response to said user input; and
   c. initiating an imaging device function on said imaging device in response to said application data.

15. A method for interacting with an imaging device, said method comprising:
   a. sending user-specific login data from said imaging device to a remote computing device;
   b. accessing a database to retrieve a first user-interface information associated with said user-specific login data, wherein said first user-interface information is related to generating a first custom user interface for said application and said first user-interface information is related to at least one user-interface customization preference selected from a group consisting of a user-interface display format, a user-interface language, a user-interface parameter, a user-interface display preference, a user-interface display component, a user-interface display-component layout, a user-interface screen, a user-interface associated with at least one function associated with said imaging device, wherein said at least one function is a most recently accessed function associated with said user-specific login data and a user-interface format;
   c. sending said first user-interface information from said remote computing device to said imaging device;
   d. receiving said first user-interface information at said imaging device from said remote computing device;
   e. displaying, on a local display panel associated with said imaging device, a first formatted user-interface content wherein said first formatted user-interface content is determined by said first user-interface information;
   f. detecting a user input at said imaging device, wherein said user input is in response to said first formatted user-interface content;
   g. sending an indication of said user input from said imaging device to said remote computing device;
   h. determining a second user-interface information in response to said user input, wherein said second user-interface information is associated with said user-specific login data, said second user-interface information is related to generating a second custom user interface for said application, and said second user-interface information is related to at least one user-interface customization preference selected from the group consisting of a user-interface display format, a user-interface language, a user-interface parameter, a user-interface display preference, a user-interface display component, a user-interface display-component layout, a user-interface screen, a user-interface associated with at least one function associated with said imaging device, wherein said at least one function is a most recently accessed function associated with said user-specific login data and a user-interface format;
   i. sending said second user-interface information from said remote computing device to said imaging device;
   j. receiving said second user-interface information at said imaging device from said remote computing device; and
   k. displaying, on said local display panel associated with said imaging device, a second formatted user-interface content wherein said second formatted user-interface content is determined by said second user-interface information.

16. The method according to claim 15, wherein said first user-interface information comprises at least one web page.

17. The method according to claim 16, wherein said at least one web page is written in a markup language.

18. The method according to claim 15, wherein said display panel is a touch panel.

19. The method according to claim 15, wherein said display panel is integral to said imaging device.

20. The method according to claim 15, wherein said display panel is separate from said imaging device.

* * * * *

UNITED STATES PATENT AND TRADEMARK OFFICE
CERTIFICATE OF CORRECTION

| | | |
|---|---|---|
| PATENT NO. | : 7,978,618 B2 | Page 1 of 1 |
| APPLICATION NO. | : 11/562342 | |
| DATED | : July 12, 2011 | |
| INVENTOR(S) | : Richardson et al. | |

It is certified that error appears in the above-identified patent and that said Letters Patent is hereby corrected as shown below:

Column 12, Line 48, should read:

Original Size

Column 12, Line 49, should read:

Special Functions - Margin Shift, Erase, Pamphlet, etc.

Signed and Sealed this
Seventeenth Day of January, 2012

David J. Kappos
*Director of the United States Patent and Trademark Office*